US011830138B2

(12) United States Patent
Aksit et al.

(10) Patent No.: US 11,830,138 B2
(45) Date of Patent: Nov. 28, 2023

(54) PREDICTING SECONDARY MOTION OF MULTIDIMENTIONAL OBJECTS BASED ON LOCAL PATCH FEATURES

(71) Applicant: ADOBE INC., San Jose, CA (US)

(72) Inventors: Duygu Ceylan Aksit, Eugene, OR (US); Mianlun Zheng, Los Angeles, CA (US); Yi Zhou, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 161 days.

(21) Appl. No.: 17/206,813

(22) Filed: Mar. 19, 2021

(65) Prior Publication Data
US 2022/0301262 A1   Sep. 22, 2022

(51) Int. Cl.
*G06T 17/20*   (2006.01)
*G06N 3/08*    (2023.01)
*G06T 7/20*    (2017.01)
*G06T 15/08*   (2011.01)

(52) U.S. Cl.
CPC .............. *G06T 17/20* (2013.01); *G06N 3/08* (2013.01); *G06T 7/20* (2013.01); *G06T 15/08* (2013.01)

(58) Field of Classification Search
CPC .......... G06T 17/20; G06T 7/20; G06T 15/08; G06T 13/00–80; G06N 3/08
See application file for complete search history.

(56) References Cited

U.S. PATENT DOCUMENTS

| 7,138,999 B2* | 11/2006 | Alliez ..................... G06T 17/20 345/426 |
| 2008/0036770 A1* | 2/2008 | Carter ..................... G06T 17/20 345/441 |
| 2010/0033488 A1* | 2/2010 | Zhou ....................... G06T 13/40 345/473 |
| 2014/0267252 A1* | 9/2014 | Hutchinson ............. G06T 13/20 345/420 |
| 2017/0091994 A1* | 3/2017 | Beeler ....................... G06T 7/11 |
| 2018/0130245 A1* | 5/2018 | Kozlov .................... G06T 13/40 |
| 2020/0027269 A1* | 1/2020 | Jiang ........................ G06T 17/10 |
| 2021/0035347 A1* | 2/2021 | Casas Guix ............ G06T 13/40 |

(Continued)

OTHER PUBLICATIONS

Fabian Hanh, et al., "Efficient simulation of secondary motion in rig-space", in Proceedings of the 12th ACM SIGGRAPH/eurographics symposium on computer animation, 2013, pp. 165-175.

(Continued)

*Primary Examiner* — Andrew G Yang
(74) *Attorney, Agent, or Firm* — SHOOK, HARDY & BACON L.L.P.

(57) ABSTRACT

Various disclosed embodiments are directed to estimating that a first vertex of a patch will change from a first position to a second position (the second position being at least partially indicative of secondary motion) based at least in part on one or more features of: primary motion data, one or more material properties, and constraint data associated with the particular patch. Such estimation can be made for some or all of the patches of an entire volumetric mesh in order to accurately predict the overall secondary motion of an object. This, among other functionality described herein resolves the inaccuracies, computer resource consumption, and the user experience of existing technologies.

20 Claims, 13 Drawing Sheets

(56) References Cited

U.S. PATENT DOCUMENTS

2021/0110001 A1\* 4/2021 Mitchell ................. G06F 30/20
2022/0114799 A1\* 4/2022 Wang ..................... G06V 10/42

OTHER PUBLICATIONS

Y. Li, H. Xu and J. Barbič, "Enriching Triangle Mesh Animations with Physically Based Simulation," in IEEE Transactions on Visualization and Computer Graphics, vol. 23, No. 10, pp. 2301-2313, Oct. 1, 2017, doi: 10.1109/TVCG.2016.2620467.
Igor Santesteban, et al., "SoftSMPL: Data-driven Modeling of Nonlinear Soft-tissue Dynamics for Parametric Humans", Computer Graphics Forum (Proc.Eurographics), 2020.
Holden, D., Duong, B. C., Datta, S., & Nowrouzezahrai, D. (Jul. 2019). Subspace neural physics: Fast data-driven interactive simulation. In Proceedings of the 18th annual ACM SIGGRAPH/Eurographics Symposium on Computer Animation (pp. 1-12).

\* cited by examiner

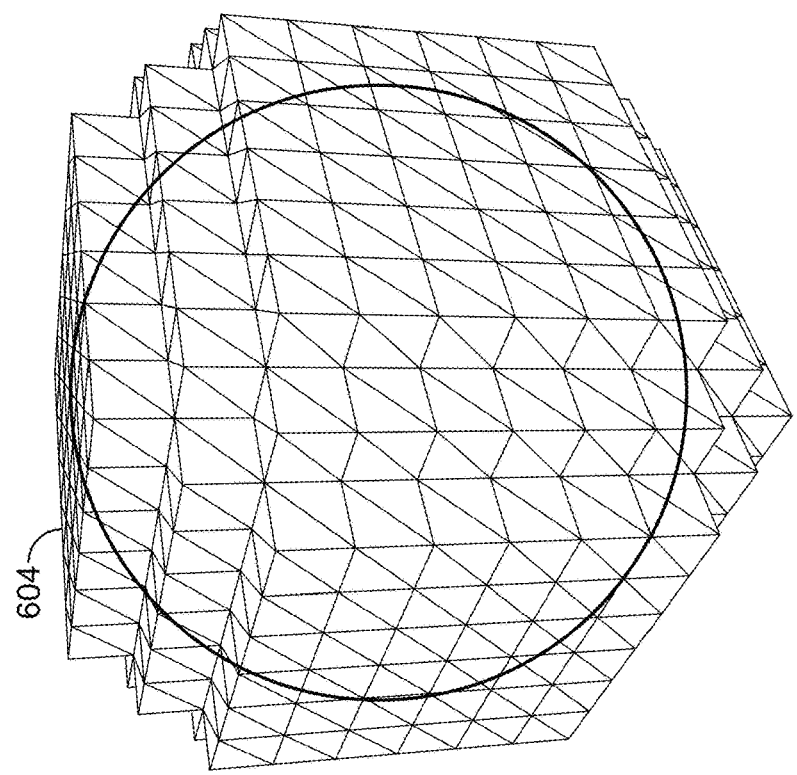
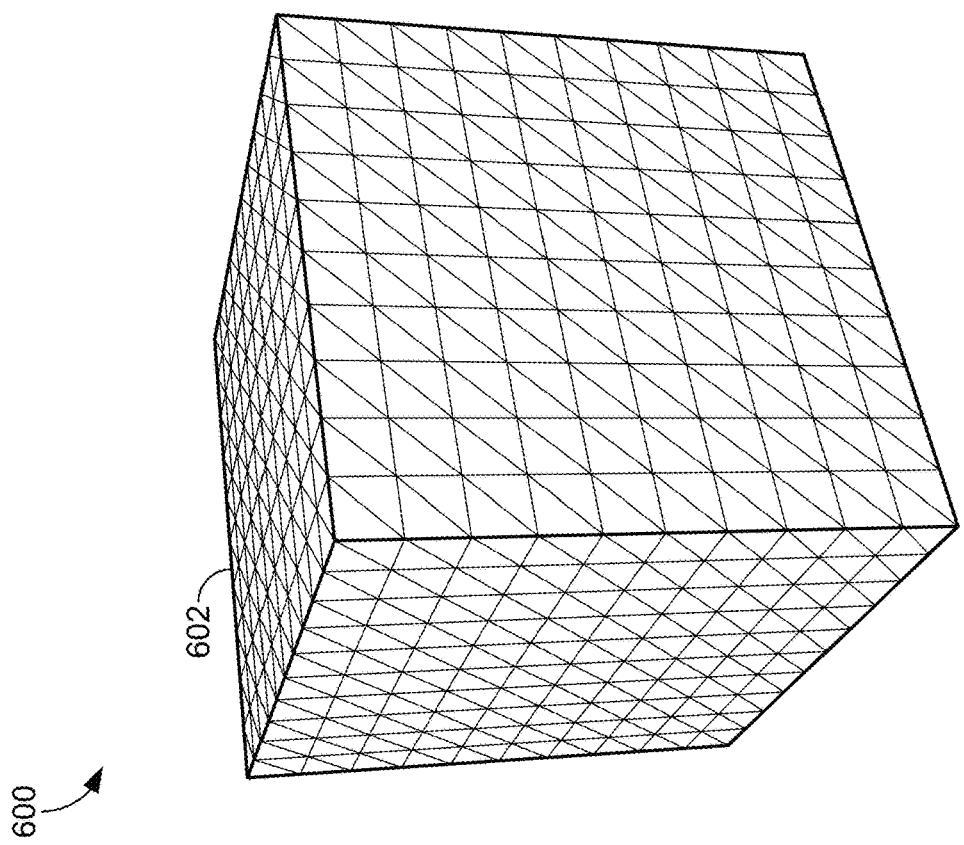
FIG. 6

PREDICTING SECONDARY MOTION OF MULTIDIMENTIONAL OBJECTS BASED ON LOCAL PATCH FEATURES

BACKGROUND

Various technologies (e.g., visual effects (VFX) software, video game animation) employ functionality for animating three-dimensional characters. The aim of these technologies is to provide realistic dynamic movements of the three-dimensional characters. However, these technologies generally lack the functionality to cause the three-dimensional characters to adequately perform secondary motion. Secondary motion is motion that occurs on an object in response to, as a compliment of, or emphasizes primary motion. For example, the primary motion of an animated character may be movement of the character's head. The secondary motion would be the intricate way the character's hair bounces in response to the character moving its head. In another example, primary motion may be the movement of a character's arm and the secondary motion may be the way the character's baggy shirt sleeve moves in response to the character's arm movement. Existing technologies are inaccurate in the estimating of secondary motion, computer resource consumption, and the user experience, among other things.

SUMMARY

One or more embodiments described herein provide benefits and solve one or more of the foregoing or other problems in existing technology with methods, systems, and non-transitory computer readable media that estimate secondary motion of an object (e.g., via a deep neural network). Such estimation may occur per patch of a volumetric mesh (e.g., a tetrahedral mesh). A "patch" is a single unit of a mesh, where each patch includes a plurality of vertices and one or more edges or lines that connect the vertices. For example, a patch may include a central vertex and ring of outer vertices, each of which are connected via edges, which form various triangular faces. In operation, various embodiments estimate that a first vertex of a patch will change from a first position to a second position (the second position being at least partially indicative of secondary motion) based at least in part on one or more features, such as: primary motion data (e.g., acceleration data, velocity data, displacement data), material properties (e.g., stiffness values, mass values), and constraint data (e.g., indications of whether a vertex is subject to any motion) associated with the particular patch. Such estimation can be made for some or all of the patches of an entire volumetric mesh in order to accurately predict the overall secondary motion of an object. This, among other functionality described herein, resolves the inaccuracies, computer resource consumption, and the user experience of existing technologies.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein:

FIG. 6 is a schematic diagrams illustrating the different volumetric meshes that various embodiments of the present disclosure train on, according to some embodiments.

DETAILED DESCRIPTION

Overview

Figure 1:
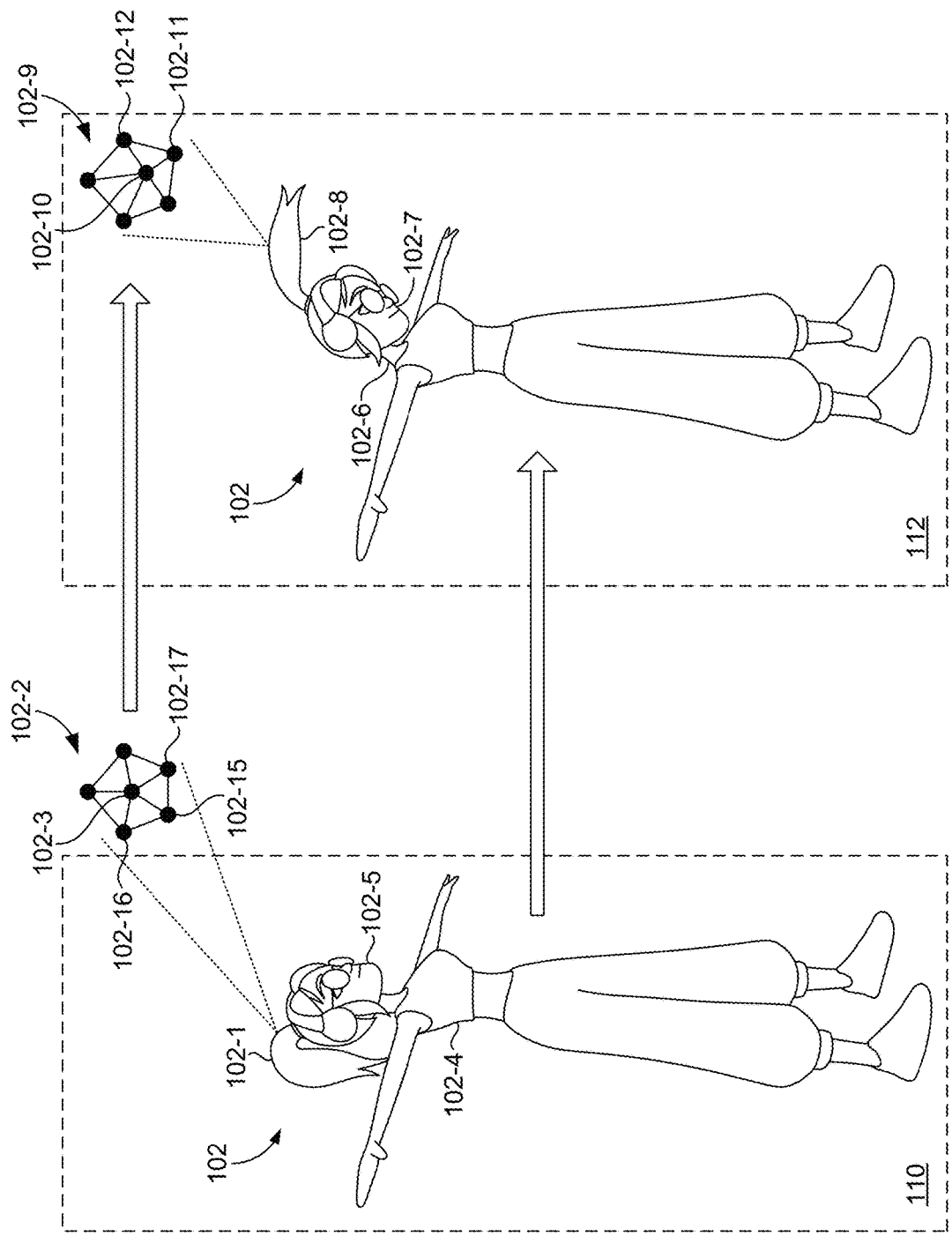
FIG. 1 is a schematic diagram illustrating an estimation of secondary motion of a character volumetric mesh based at least in part on estimating a change in position of a center vertex of a single patch, according to some embodiments.

Computer animation is the process of digitally generating animated objects, such as dynamic 3-dimensional (3D) characters and their corresponding movements. Various technologies, such as computer games and film visual effects software, use various techniques for animating 3D characters. Artists need user-friendly and robust technologies to preview how character animations look with regard to movement dynamics. Dynamics describe how objects move using principles of physics to simulate real-world forces. Typically, users can indicate different dynamic actions an object is to take, and various technologies can determine how to animate that object in a way that indicates real world movement, such as primary and secondary motion. However, existing technologies are computer resource intensive, inaccurate, and negatively affect the user experience when attempting to estimate secondary motion and render the corresponding object.

Existing physically-based simulation technologies are computationally complex and computer resource intensive. Physically-based simulation is the concept of creating motion through physics-based skinning animations. "Skinning" is the process of binding the actual 3D mesh to the joint structure representations (e.g., "bones" or "skeleton") a user has created. In other words, skinning is the process of defining how the geometric surface of an object deforms according to a function of the skeletal poses. These physics-based technologies provide controllable dynamic details to the input animation, which augments the animation with realistic effects. Although these physically-based technologies can perform secondary motion to skinned animations, it does so at the cost of heavy computation due to the various and complex calculations that need to be executed to simulate realistic movements at the mesh level. Such heavy computation causes CPU latency, bottlenecking, and CPU over-utilization, among other things. In terms of CPU utilization, for example, processes must extensively wait in the processor queue for a previous process to complete execution due to the complex equations that need to be calculated. In terms of bottlenecking, the CPU in physically-based technologies cannot keep up with the processing speed of a graphics card associated with a GPU due to the calculation complexity, which causes CPU bottlenecking. It is also difficult to transplant the physically-based simulation from CPU to GPU because of the complex memory allocation processing during computation. Additionally, the user-experience is negatively affected because these complex calculations are time consuming and so the user has to arduously wait to receive the results.

To address these computation complexity issues using physically-based simulation, various learning-based technologies (e.g., neural network technologies) have been formulated to learn the dynamic motions from simulation data. However, these technologies are inaccurate in the estimating of secondary motion. Specifically, these technologies have at least four limitations. First, in order to avoid the computational complexity of training networks on high-resolution meshes, some technologies operate on reduced subspaces with limited degrees of freedom. Lower degrees of freedom causes oversimplified or static secondary movements of meshes and renderings, and thus leads to inaccuracies. A "mesh" is a representation of an object and a set of rules to specify how to represent the object (e.g., how to apply the texture, shadows, and movement). Secondly, these technologies can only handle meshes with a fixed number of vertices and connectivity, leading to the requirement of training for each target mesh. Such strict requirements lead to the inability to generalize on a new unseen mesh, and thus causes overfitting or underfitting, which leads to inaccuracies.

Additionally, existing learning-based technologies train neural networks only directly on the surface mesh, leading to inaccuracies. A "surface mesh" is a mesh that exists only on an outside surface of an object, as opposed to a "volumetric mesh" that exists inside of the object (e.g., inside of the surface mesh) or in an interior volume of the object. However, surface meshes only capture the surface dynamics of an object, but not certain interior forces responsible for certain dynamics. For example, some humanoid biomechanical secondary movements (e.g., deformation or "jiggling" of skin) are at least partially defined by interior forces inside the body. Lastly, there is no user interface provided to the artist for controlling the behavior of the predicted dynamic movement, such as setting material properties over the character mesh. This is arduous for users who are not familiar with animation dynamics.

Various embodiments of the present disclosure provide various technical solutions to these problems indicated above, as well as other problems. In operation, various embodiments of the present disclosure are directed to estimating the secondary motion of an object. Such estimation may occur at the patch level of a volumetric mesh (e.g., a tetrahedral mesh). A "patch" is a single unit of a mesh, where each patch includes a plurality of vertices and one or more edges or lines that connect the vertices. For example, a patch may include a center vertex and ring of outer vertices, each of which are connected via edges, which form various triangles. In operation, various embodiments estimate that a first vertex of a patch will change from a first position to a second position (the second position being at least partially indicative of secondary motion) based at least in part on one or more features of: primary motion data (e.g., acceleration data), one or more material properties (e.g., stiffness values), and constraint data (e.g., indications of whether the patch is subject to secondary motion) associated with the particular patch. Such estimation can be made for some or all of the patches of an entire volumetric mesh in order to accurately predict the overall secondary motion of an object.

Various embodiments of the present disclosure improve physically-based simulation technologies by not being as computationally complex and thus computer resource intensive. The secondary motion dynamics of a vertex is mostly affected by its current state, as well as the internal forces due to the vertex's neighboring vertices of the same patch. Accordingly, various embodiments of the present disclosure avoid the computational complexity (and CPU latency, bottlenecking, and utilization) of physically-based simulation technologies by performing estimations at the patch level, as opposed to the calculation-complex mesh level.

Various embodiments of the present disclosure also improve the accuracy with respect to existing learning-based technologies. As described above, the secondary motion dynamics of a vertex is mostly affected by its current state, as well as the internal forces due to the vertex's neighboring vertices of the same patch. Accordingly, various embodiments of the present disclosure estimate vertex positions of a single patch based on features (e.g., stiffness, constraints, and primary data) associated with the patch to eventually infer the overall secondary motion. Such functionality can thus be applied to any character mesh, independent of its overall topology (e.g., the shape, size, texture, type, etc.) because these estimations are done at the patch level and not the mesh level. Therefore, various embodiments are able to better generalize secondary motion estimations for any character mesh topology, and thus not be problematic in terms of overfitting and underfitting. This is different than existing learning-based technologies that require a fixed mesh topology, which requires different networks to be trained for different meshes, leading to overfitting and underfitting issues.

As a unique benefit of being able to generalize, it is not necessary to construct a massive training dataset of complex meshes and motions (which also consumes a lot of memory), which existing learning-based technologies do. Instead, particular embodiments improve these technologies by constructing a training dataset from primitive geometries (e.g., a volumetric mesh of a sphere, cylinder, cube, etc.). Accordingly, embodiments save on memory storage and model building resources, while still retaining high accuracy. Additionally, aggregating or using some or each local patch to infer an overall secondary motion allows for more degrees of freedom relative to existing technologies, and therefore provides more dynamic and finer-grained secondary movements.

Additionally, various embodiments of the present disclosure improve learning-based technologies by deriving volumetric meshes (e.g., uniform volumetric meshes). In contrast to existing technologies, which train networks directly on the surface mesh, as described above, various embodiments use volumetric meshes. Volumetric meshes provide a more efficient coarse representation and can handle character meshes that include multiple disconnected components, unlike surface meshes. Volumetric meshes not only capture the surface of the character but also the interior, unlike surface meshes, leading to more accurate learning of the internal dynamic forces and thus estimation of secondary motion. As described above, in some instances, secondary motion is driven by internal forces in a body and so various embodiments are able to capture these internal forces better than existing technologies.

Various embodiments of the present disclosure also improve the user experience relative to existing technologies. Unlike existing technologies, various embodiments are configured to allow users to adjust parameter or feature values that are used to estimate secondary motion. For example, some user interfaces are configured to allow users to adjust or set material properties or constraint data. This is less burdensome for users who are not familiar with animation dynamics. By being able to set or adjust these features, users can control the dynamic effects, such as the deformation magnitude, which existing technologies do not allow. Additionally, users do not have to arduously wait to receive the results because there are no computational complexity issues, as is prevalent in physically-based simulation technologies.

Referring now to FIG. 1, a schematic diagram illustrating, at a high level, the estimation of secondary motion of a character volumetric mesh 102 based at least in part on estimating a change in position of a center vertex of a single patch, according to some embodiments. The volumetric mesh 102 represents a character, such as a person. The volumetric mesh 102 includes the hair mesh 102-1, which represents the hair of a character associated with the character volumetric mesh 102. The hair mesh 102-1 (as well as the rest of the volumetric mesh 102) includes a plurality of patches, such as the patch 102-2, which includes several vertices and edges, such as the vertex 102-3. The volumetric mesh 102 further includes a head portion 102-5 (representing a head of a person) and a neck portion 102-4 (representing a neck that the head is connected to). All of these features represent the volumetric mesh 102 at a first time frame 110. The time frame 112 represents the volumetric mesh 102 at a later subsequent time frame relative to time frame 110 based on dynamic animation movement.

An artist user may desire to create some primary dynamic movement with the volumetric mesh 102, such as bending the neck portion 102-4 at time frame 110 to the neck position as indicated in the neck portion 102-6 at time frame 112. Consequently, the head portion 102-5 changes its position to 102-7, as illustrated at time frame 112. In response to the primary movement of the neck, secondary motion of the hair mesh 102-1 may occur, which causes a change in the hair mesh 102-1 at the first time period 110 to the hair mesh 102-8 at the second time frame 112 (e.g., a person's hair may have bounced upon primary movement). FIG. 1 illustrates that the secondary motion or position of the hair mesh 102-8 at time frame 112 can be predicted based on patch-level vertex movement estimations, as described in more detail below. For example, various embodiments can estimate that the center vertex 102-3 of the patch 102-2 will change from its position as indicated in the patch 102-2 to another position, as indicated by the center vertex 102-10 within the patch 102-9. As illustrated in FIG. 1, the center vertex 102-10 is closer to the vertices 102-11 and 102-12 relative to the corresponding vertices in the patch 102-2. Various embodiments describe how the secondary motion functionality is estimated in more details below.

Figure 2:
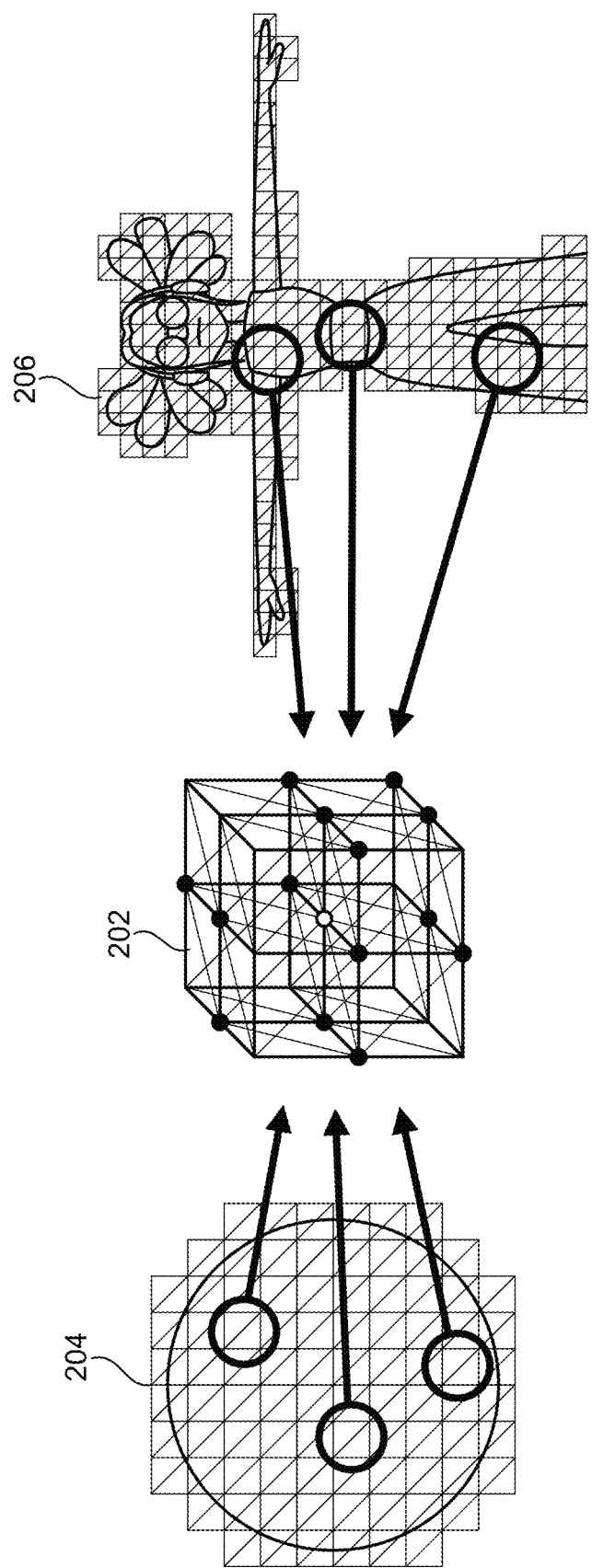
FIG. 2 is a schematic diagram illustrating a set of patches of a tetrahedral simulation volumetric mesh and the embedded surface meshes derived from different objects, according to some embodiments.

Referring now to FIG. 2, a schematic diagram that illustrates a set of patches 202 of a tetrahedral simulation volumetric mesh and the embedded surface meshes derived from object 204 and/or 206, according to some embodiments. FIG. 2 also illustrates that the set of patches 202 can look identical, even though they are derived from different objects 206 and 204, which means that particular embodiments can better generalize relative to existing technologies since these embodiments perform estimations at the patch level, as described herein.

In some embodiments, given a 3D character (e.g., 206) and its primary motion sequence obtained using standard linear blend skinning techniques, some embodiments construct a volumetric (e.g., tetrahedral) mesh and a set of barycentric weights to linearly embed the vertices of the character's (e.g., object 204 and 206) surface mesh into the volumetric mesh, as shown with respect to the set of patches 202. As illustrated in FIG. 2, patches (e.g., within the set of patches 202) can include vertices and edges that are oriented in particular X, Y, and Z planes (three-dimensional), which is a characteristic of a volumetric mesh. This is in contrast to surface meshes, which tend to be oriented in 2-dimensional X, Y planes.

Various embodiments utilize the volumetric mesh and predict the updated vertex positions with deformable dynamics (also called the secondary motion) at each frame given the primary motion data, the constraint data, and the material properties data. In some embodiments, the updated volumetric mesh vertex positions then drive the original surface mesh via the barycentric embedding, and the surface mesh is used for rendering.

Various embodiments described herein denote the reference tetrahedral mesh and the number of its vertices by X and n, respectively. In some embodiments described herein, the skinned animation (primary motion) is represented as a set of time-varying positions $x \in \mathbb{R}^n$ Similarly, particular embodiments denote the predicted dynamic mesh by U and its positions by $u \in \mathbb{R}^{3n}$.

Particular embodiments additionally encode mass $m \in \mathbb{R}^n$ and stiffness $k \in \mathbb{R}^n$ properties. In some instances, the stiffness is represented as Young's modulus. By painting or setting different material properties per vertex over the mesh, users can control the dynamic effects, namely the deformation magnitude, as described herein.

In contrast to previous technologies, which train neural networks directly on the surface mesh, particular embodiments utilize the volumetric mesh for several reasons. First, volumetric meshes provide a more efficient coarse representation and can handle character meshes that include multiple disconnected components. For example, a full rendering of the object 206 may consist of 14k vertices whereas the corresponding volumetric mesh only has 1k vertices. Furthermore, volumetric meshes not only capture the surface of the character but also the interior, leading to more accurate learning of the internal forces. Some embodiments use a uniformly voxelized mesh (also referred to as "uniform volumetric meshes") subdivided into tetrahedra as the volumetric mesh, which enables particular embodiments to generalize across character meshes with varying shapes and resolutions. For example, even though objects 206 and 204 are vastly different shapes and size, they both can include a set of patches 202 that are identical or similar, as illustrated in FIG. 2. Different surface meshes have different resolution, which leads to the problem of training a network in a very large space that covers more resolution as possible. Using uniform volumetric meshes makes it easy to train and apply the network. That is why in the FIG. 2, the sphere is different from the person (surface mesh level), but their volumetric patches are identical.

Figure 3:
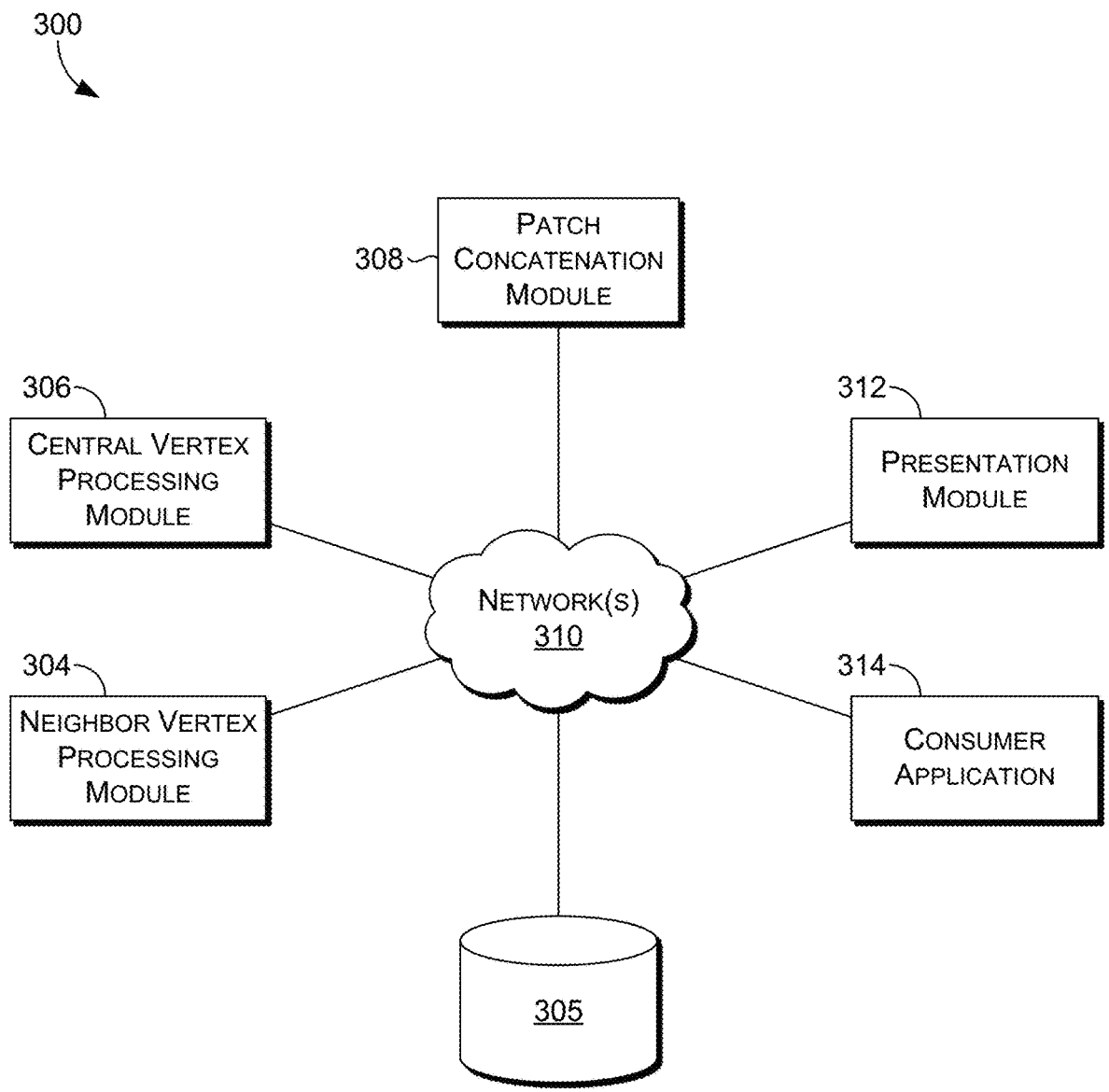
FIG. 3 is a block diagram illustrating high-level aspects of an example computing system architecture suitable for implementing embodiments of the present disclosure.

Referring now to FIG. 3, a block diagram is provided showing high-level aspects of an example computing system architecture suitable for implementing embodiments of the disclosure and designated generally as the system 300. The system 300 represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For example, some or each of the components of the system may be located within a single computing device (e.g., the computing device 1300 of FIG. 13). Alternatively, some or each of the components may be distributed among various computing devices, such as in a distributed cloud computing environment. In some embodiments, the system 300 and each of the components are located within the server and/or user device of FIG. 12, as described in more detail herein.

The system 300 is generally responsible for predicting secondary motion of an object based on estimating a movement parameter (e.g., position, acceleration, or velocity) of one or more vertices of one or more patches, according to some embodiments. The system 300 includes a neighbor vertex processing module 304, a central vertex processing module 306, a patch concatenation module 308, a presentation module 312, a consumer application 314, and storage 305, each of which are communicatively coupled via one or more networks 310. The network(s) 310 can be any suitable network(s), such as a Local Area Network (LAN), a Wide Area Network (WAN), the internet, or a combination of these, and/or include wired, wireless, or fiber optic connections. In general, network(s) 310 can represent any combination of connections (e.g., APIs or linkers) or protocols that will support communications between the components of the system 200. In some embodiments, the modules 304, 306, and 308 represent Multi-Layer Perception (MLP) components. MLP refers to feed forward neural networks, where connections between nodes do not form a cycle (as opposed to a Recurrent Neural Network (RNN)). The components of the system 300 may be embodied as a set of compiled computer instructions or functions, program modules, computer software services, logic gates, or an arrangement of processes carried out on one or more computer systems.

The neighbor vertex processing module 304 is generally responsible for extracting and processing the input features from all neighbor vertices within a first patch (e.g., except a central vertex). In some embodiments, a "neighbor" vertex is any vertex that is connected to a vertex via one or more edges or lines, except a central vertex (e.g., a vertex in the middle of other vertices). For example, referring back to FIG. 1, the neighbor vertex processing module 304 can extract information from vertex 102-15, and its neighbors 102-17 and 102-16. As illustrated in FIG. 1, each "neighbor" vertex (e.g., a first vertex) at least partially defines a boundary of the local patch 102-2. In some embodiments, a "central vertex", such as the central vertex 102-3 does not define a boundary of a local patch but instead is situated in the center of a local patch or is situated between the neighbor vertices.

The central vertex processing module 306 is generally responsible for extracting and processing input features from a central vertex within the same first patch (e.g., central vertex 102-3). The patch concatenation module 308 is generally responsible for concatenating or aggregating feature information from modules 304 and 306 by taking the output from the neighbor vertex processing module 304 and the central vertex processing module 306 to calculate or estimate the prediction target (e.g., the position, such as the magnitude (the amount) and the direction (e.g., X, Y, or X plane)) for the central vertex.

In various embodiments, the processed or extracted features described above (e.g., the inputs to a deep neural network) include one or more of three features for the corresponding vertices in the first patch—primary motion data (e.g., current acceleration, position (or displacement), or velocity of a vertex), material property data (e.g., stiffness or mass values of a given vertex), and constraint data (e.g., whether the vertex is part of a patch that is subject/not subject to secondary motion). In some embodiments, the dynamic mesh information includes three consecutive time frames of displacements on the vertex, $u_i$ (−2), $u_i$ (−1), $u_i$ (+0). The calculation of these features are described in more detail below. In some embodiments, each of these values is encoded into a separate feature vector embedding for each corresponding neighboring vertex and central vertex (e.g., for each vertex within the patch 102-2). For example, the vertex 102-3 of FIG. 1 may be mapped to three individual feature vectors—a primary motion vector, a material property vector, and a constraint data vector. Alternatively, in some embodiments, each of these three values are converted or encoded as a single feature vector for each corresponding neighboring vertex and central vertex.

In some embodiments, and as described in more detail below, during training, the input dynamic mesh information (e.g., the primary motion data) comes from the ground truth, while during testing, it comes from a model's last prediction recurrently. In some embodiments, in response to the model predicting the output of $u_i$ (+1) for the next future time frame, various embodiments update the dynamic mesh and form the new input feature (e.g., primary motion data). Similarly, the material property information may also include historical time frames. But the material property information is pre-defined in some embodiments (instead of obtaining it recurrently), so it does not change from one time frame to another.

The presentation module 312 is generally responsible for presenting content (or causing presentation of content) and related information to a user, such as a volumetric mesh, a visual rendering, or a patch. Presentation module 312 may comprise one or more applications or services on a user device, across multiple user devices, or in the cloud. For example, in one embodiment, presentation module 312 manages the presentation of content to a user across multiple user devices associated with that user. Based on content logic, device features, and/or other user data, presentation module 312 may determine on which user device(s) content is presented, as well as the context of the presentation, such as how (or in what format and how much content, which can be dependent on the user device or context) it is presented, when it is presented, etc. In particular, in some embodiments, presentation module 312 applies content logic to device features, or sensed user data to determine aspects of content presentation.

In some embodiments, presentation module 312 generates user interface features. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. For example, the presentation module 312 can cause presentation of a visual rendering that reflects a character object, a sliding UI element allowing the user to change material property values, and click fields allowing the user to change constraint information. The presentation module 312 can additionally or alternatively cause presentation of other contextual data or metadata, such as timestamps of when an image was uploaded, source images, UI elements for users to manipulate visual renderings, and the like.

Consumer applications 314 generally refers to one or more computer applications or services, such as online/cloud applications or locally stored apps that consume, include, or utilize some or each of the components of the system 300. In particular, a consumer application 314 may allow users to generate and provide a mesh and provide a visual rendering. In some embodiments, a consumer application 314 may utilize the presentation module 312 to cause presentation of meshes or visual renderings. Examples of consumer applications 314 may include, without limitation, computer applications or services for presenting media, editing media, and/or 3-D animation software (e.g., Adobe Illustrator®, Adobe Dimension®, Substance Painter®) or other computer applications that include such functionality, such as social media service applications (e.g., PINTEREST, FACEBOOK, etc.), email, messaging, chat, or any other web application, plugin, extension, or locally stored application.

The storage 305 (e.g., a database, RAM, cache, persistent storage, etc.) can include different training data (e.g., volumetric spheres and cubes) that have been used to train deep networks or other machine learning models, as described in more detail below. Additionally or alternatively, storage 305 can include the maps or objects generated by the modules 304, 306 308, different uploaded input meshes, and the like.

Figure 4:
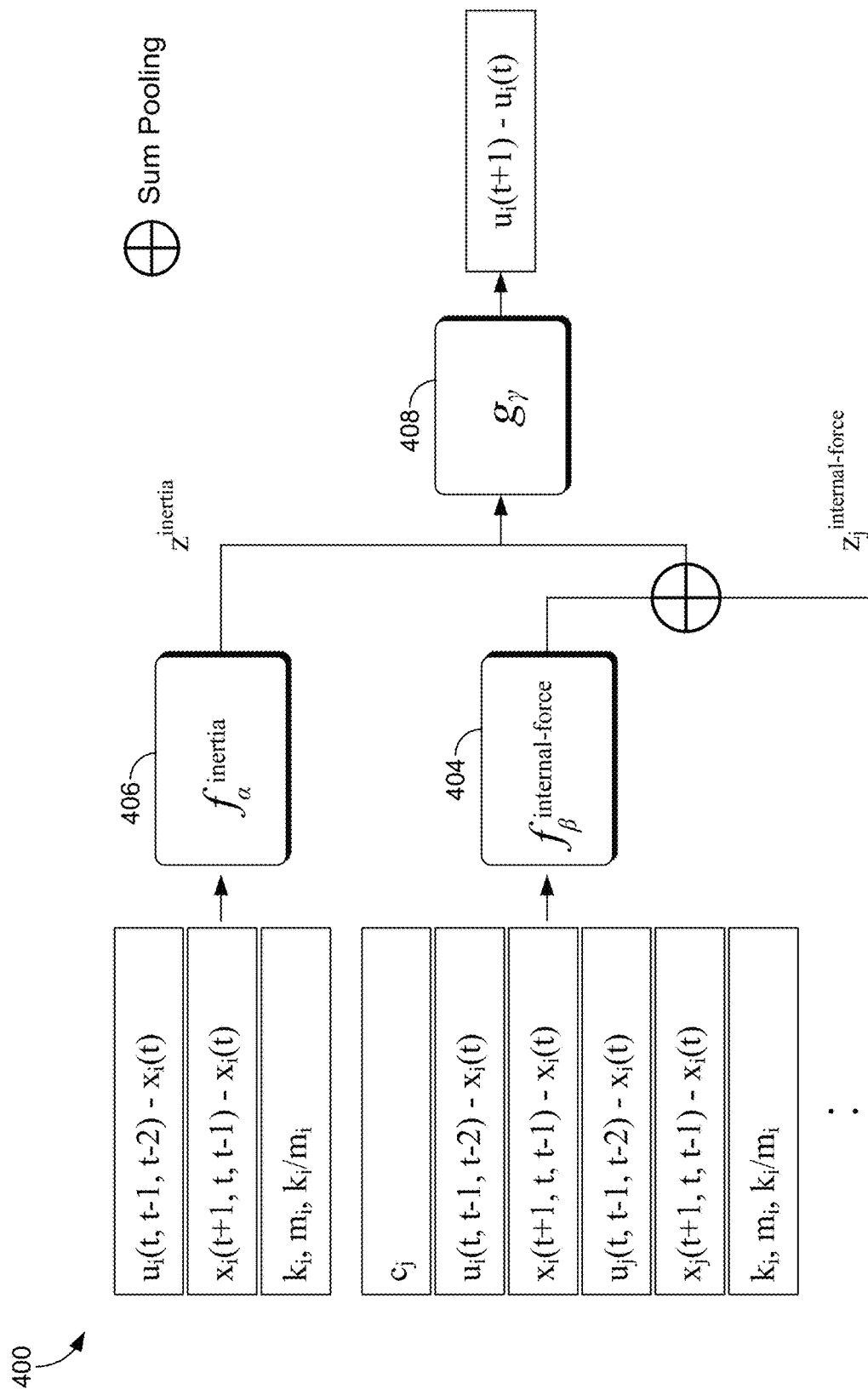
FIG. 4 is a block diagram illustrating high-level aspects of an example computing system architecture suitable for implementing embodiments of the present disclosure.

Referring now to FIG. 4, a block diagram is provided showing high-level aspects of an example computing system architecture 400 suitable for implementing embodiments of the disclosure and designated generally as the system 400. The system includes 3 components—the multi-layer perceptron (MLP) 404, the MLP 406, and the MLP 408. In some embodiments, the system 400 is included in the system 300 of FIG. 3 and represents one or more modules described with respect to FIG. 3. For example, in some embodiments, the MLP 404 represents the neighbor vertex processing module 304 of FIG. 3. Likewise, in some embodiments, the MLP 406 represents the central vertex processing module 306 of FIG. 3. Likewise, in some embodiments, the MLP 408 represents the patch concatenation module 308 of FIG. 3.

FIG. 4 illustrates a learning-based approach (e.g., via training) to enhance skinning-based animations of 3D characters with secondary motion effects based on a neural network that encodes each local patch of a character simulation mesh where the edges implicitly encode the internal forces between the neighboring vertices. The network emulates the ordinary differential equations of the character dynamics, predicting new vertex positions from the current accelerations, velocities and positions. Being a local method (i.e., a method that makes predictions at the patch level), such neural network is independent of the mesh topology and generalizes to arbitrarily-shaped 3D character meshes at test time. Various embodiments further allow per-vertex constraints and material properties such as stiffness, enabling users to easily adjust the dynamics in different parts of the mesh.

As illustrated in FIG. 4, various embodiments of the present disclosure improve upon constraint-based physically-based simulation technologies. In constraint-based physically-based simulation, the equations of motion are:

$$M\ddot{u}+D\dot{u}+f\_int(u)=0$$

subject to $Cu=Sx(t)$, (1)

where $M \in R^{(3n \times 3n)}$ is the diagonal (lumped) mass matrix (as commonly employed in interactive applications), D is the Rayleigh damping matrix, and $u \in R^{3n}$, $\dot{u} \in R^{3n}$ and $\ddot{u} \in R^{3n}$ represent the positions, velocities and accelerations, respectively. The quantity $f\_int(u)$ represents the internal elastic forces. Secondary dynamics occurs because the constraint part of the mesh "drives" the free part of the mesh. Constraints are specified via the constraint matrix C and the selection matrix S. In order to leave room for secondary dynamics for 3D characters, various embodiments do not constrain all the vertices of the mesh, but only a subset. For example, various embodiments constrain the legs, the arms and the core inside the torso and head (i.e., these parts are defined as not being part of secondary motion), but do not constrain the belly and hair, so that secondary motion dynamics can be generated in those unconstrained regions.

One approach to timestep Equation 1 is to use an explicit integrator, such as the central differences:

$$\dot{u}(t+1)=\dot{u}(t)+((\ddot{u}(t)+\ddot{u}(t+1))/2)\Delta t,$$

$$u(t+1)=u(t)+\dot{u}(t)\Delta t+\ddot{u}(t)\Delta t^2/2 \quad (2)$$

where t and t+1 denote the state of the mesh in the current and next frames and $\Delta t$ is the time step. While the explicit integration is fast, it suffers from stability issues. Hence, the slower but stable implicit backward Euler integrator is often preferred in physically-based simulation:

$$\dot{u}(t+1)=\dot{u}(t)+\ddot{u}(t+1)\Delta t,$$

$$u(t+1)=u(t)+\dot{u}(t+1)\Delta t. \quad (3)$$

In various instances, implicit integration can be approximated by:

$$\dot{u}(t+1)=\dot{u}(t)+f\_\theta(u(t),\dot{u}(t),\ddot{u}(t),x(t),\dot{x}(t),\ddot{x}(t),m,k)\Delta t,$$

$$u(t+1)=u(t)+\dot{u}(t+1)\Delta t, \quad (4)$$

where f is a differentiable function constructed as a neural network with learned parameters θ.

As shown in Equation (1), predicting the secondary dynamics entails solving for 3n degrees of freedom for a mesh with n vertices. Hence, directly approximating $f\_\theta$ in Equation (4) to predict all the degrees of freedom at once would lead to a huge and impractical network, which would furthermore not be applicable to input meshes with varying number of vertices and topologies. Instead, various embodiments of the present disclosure contemplate that within a very short time moment, the motion of a vertex is only affected by its own inertia and the internal forces from its neighboring vertices. Accordingly, the components of system 400 are configured to operate on a local patch level instead. As illustrated in FIG. 1, for example, a 1-ring local patch includes one center vertex along with its immediate neighbors in the volumetric mesh. Even though two characters might have very different mesh topologies, their local patches will often be more similar, boosting the generalization ability, as described herein.

In some embodiments, the internal forces are caused by the local stress, and the aggregation of the internal forces acts to pull the vertices to their positions in the reference motion, to reduce the elastic energy. Thus, the knowledge of the per-edge deformation and the per-vertex reference motion are needed for secondary motion prediction in some instances. Accordingly, various embodiments emulate this process as follows:

$$z_i^{inertia} = f_\alpha^{inertia}(u_i, x_i, k_i, m_i), z_{i,j}^{internal\,force} \quad (5)$$
$$= f_\beta^{internal\,force}(u_{i,j}, x_{i,j}, k_i, m_i), u_i'$$
$$= g_\gamma\left(z_i^{inertia}, \sum_{j \in N_i} z_j^{internal\,force}\right),$$

where $f_\alpha^{inertia}$ (i.e., MLP 406), $f_\beta^{internal\,force}$ (i.e., MLP 404) and $g_\gamma$ (i.e., MLP 408) are three different multi-layer perceptrons (MLPs). $N_i$ are neighboring vertices of i (excluding i), and the double indices i, j denote the central vertex i and a neighbor j. Quantities $z_i^{inertia}$ and $z_i^{internal\,force}$ are high dimensional latent vectors that represent an embedding for inertia dynamics and the internal forces from each neighboring vertex, respectively. Perception $g_\gamma$ (i.e., MLP 408) receives the concatenation of $z_i^{inertia}$ (i.e., MLP 406) and the sum of $z_i^{internal\,force}$ (i.e., MLP 404) to predict the final acceleration (or other movement parameter) of a vertex i. In practice, for simplicity, various embodiments train $g_\gamma$ to directly predict ú(t+1)−u(t) since a fixed timestep of Δt can be assumed.

Some embodiments implement all the three MLPs 404, 406, and 408 with four hidden fully connected layers activated by the Tan h function, and one output layer. During training, some embodiments provide the ground truth positions in the dynamic mesh (e.g., a volumetric mesh) as input. During testing, particular embodiments provide the predictions (e.g., the estimations of the movement parameter) of the network as input in a recurrent manner.

In some embodiments, the $f_\alpha^{inertia}$ MLP 406 focuses on the center vertex itself, encoding the "self-inertia" information. That is, the center vertex tends to continue its current motion, driven by both its velocity and acceleration. In particular embodiments, the input to $f_\alpha^{inertia}$ is the position of the center vertex in the last X (e.g., three) times frames both on the dynamic and reference mesh, u(t), u(t−1), u(t−2) and x(t+1),x(t),x(t−1) as well as its material properties, $k_i, m_i, k_i/m_i$. The positions can be represented in local coordinates with respect to x(t), the current position of the center vertex in the reference motion. In some instances, the positions in the last X time frames implicitly encode the velocity and the acceleration. Since the net force applied on the central vertex is divided by its mass in Equation 4 and it is relatively hard for the network to learn multiplication or division, various embodiments also include $k_i/m_i$ explicitly in the input. The hidden layer and output size may be 64 in some embodiments.

For an unconstrained center vertex i, in some embodiments the $f_\beta^{internal\,force}$ MLP 404 encodes the "internal forces" contributed by its neighbors. In some embodiments, the input to the MLP 304 is similar to $f_\alpha^{inertia}$ (i.e., MLP 406), except that particular embodiments provide information both for the center vertex as well as its neighbors. For each neighboring vertex j, particular embodiments provide the constraint information $c_j$ ($c_j$=0 if a free vertex; $c_j$=1 if constrained). In some embodiments, each $f_\beta^{internal\,force}$ provides a latent vector for the central vertex. The hidden layer and output size is 128 in some embodiments.

In some embodiments, the $g_\gamma$ MLP 408 receives the concatenated outputs from $f_\alpha^{inertia}$ (i.e., MLP 406) and the aggregation of $f_\beta^{internal\,force}$ (i.e., MLP 404) and predicts the final displacement of the central vertex i in the dynamic mesh. The input and hidden layer size is 192 in some embodiments.

Some embodiments train the final network with the mean square error loss:

$$l = \frac{1}{n}\sum_i^n \left\| u_i'(t+1) - u_i''(t+1) \right\|_2^2, \quad (6)$$

where ú′$_i$(t+1) is the ground truth. Some embodiments adopt the Adam optimizer for training, with a learning rate starting from 0.0001 along with a decay factor of 0.96 at each epoch.

Figure 5:
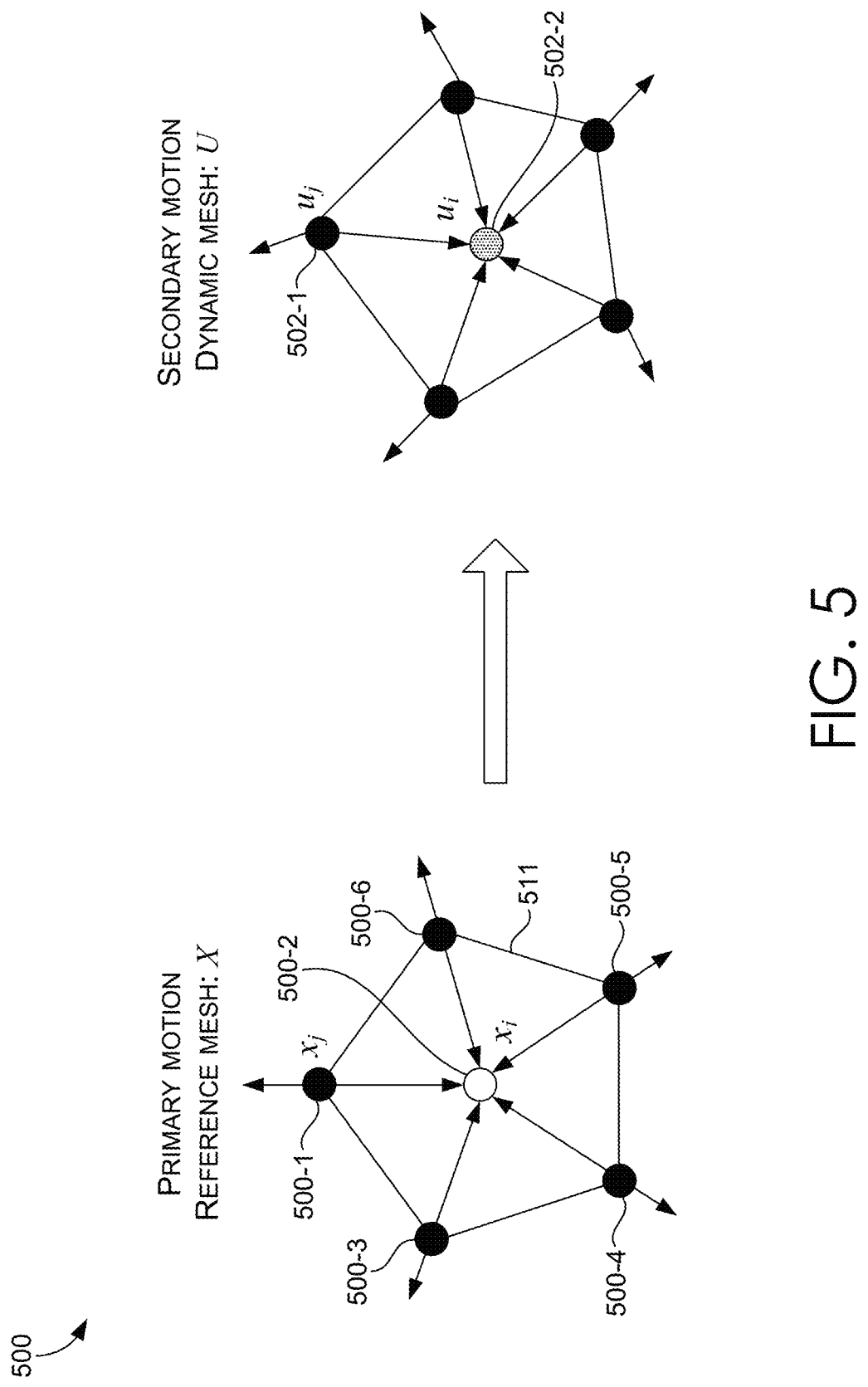
FIG. 5 is a schematic diagram of a local patch, illustrating how secondary motion for vertices are estimated, according to some embodiments.

FIG. 5 is a schematic diagram of a local patch, illustrating how secondary motion for vertices are estimated, according to some embodiments. The local patch 500 includes one central vertex 500-2, along with its immediate neighbors (e.g., those vertices connected to it via a single edge) 500-1, 500-3, 500-4, 500-5, and 500-6. FIG. 5 also illustrates various edges connected to the vertices, such as the edge 511, which connects vertices 500-6 and 500-5.

As described herein, in some embodiments, the skinned animation (e.g., primary motion) is represented as a set of time-varying positions x□R^3n. Similarly, particular embodiments denote the predicted dynamic mesh by U and its positions by u□R^3n. Accordingly, for example, the neighboring vertices 500-1, 500-3, 500-4, 500-5 are denoted by $X_j$ and the central vertex is denoted by $X_i$ (all of which can represent a primary or reference state) and some or all of the corresponding vertices, such as 502-1 are denoted by $U_j$ and vertex 502-2 is denoted by $U_i$ (all of which can represent secondary motion).

FIG. 6 is a schematic diagrams illustrating the different volumetric meshes that various embodiments of the present disclosure train on, according to some embodiments. Specifically, various embodiments train on the cube mesh 602 and/or the sphere mesh 604. Alternatively or additionally, other volumetric meshes are utilized, such as a cylindrical mesh, three-dimensional prism, a three-dimensional triangle, a three-dimensional rectangle, and the like.

The training data set includes dynamic meshes of a three-dimensional cube 602 and a three-dimensional sphere 604. Some embodiments employ a finite element method (FEM) to simulate the dynamics of the cube 602 and the sphere 604 under random rigid motion. For testing, some embodiments apply the trained network to a 3-dimensional character, which is not seen in the training dataset. Particular embodiments first generate the reference meshes of the 3D character driven by a sequence of rigid motion on the limbs (e.g., arms or legs). Then, some embodiments feed the reference mesh together with the stiffness (or other or other material properties) into the network and obtain meshes with the secondary dynamics.

As described herein, various embodiments are able to better generalize secondary motion estimations for any character mesh topology, and thus not be problematic in terms of overfitting and underfitting. This is different than existing learning-based technologies that require a fixed mesh topology, which requires different networks to be trained for different meshes, leading to overfitting and underfitting issues. As a unique benefit of being able to generalize, it is not necessary to construct a massive training dataset of complex meshes and motions (which also consumes a lot of memory), which existing learning-based technologies do. Instead, particular embodiments improve these technologies by constructing a training dataset from primitive geometries (e.g., the sphere 604 and the cube 602). Accordingly, embodiments save on memory storage and model building resources, while still retaining high accuracy.

Because various embodiments operate on local patches, it is not necessary to train it on complex character meshes. In fact, the training dataset constructed by simulating basic primitives, such as a sphere (under various motions and material properties) (e.g., sphere 604), is sufficient to generalize to various character meshes at test time. Specifically, various embodiments generate random motion sequences by prescribing random rigid body motion of a constrained beam-shaped core inside the spherical or other primitive mesh. The motion of this rigid core excites dynamic deformations in the rest of the primitive volumetric mesh. Each motion sequence starts by applying, to the rigid core, a random acceleration and angular velocity with respect to a random rotation axis. Next, various embodiments reverse the acceleration so that the primitive returns back to its starting position, and let the primitive's secondary dynamics oscillate out for a few (e.g., five) frames. While the still motions ensure that the cases are covered where local patches are stationary (but there is still residual secondary dynamics from primary motion), the random accelerations help to sample a diverse set of motions of local patches as much as possible. Doing so enhances the network's prediction stability.

Figure 7:
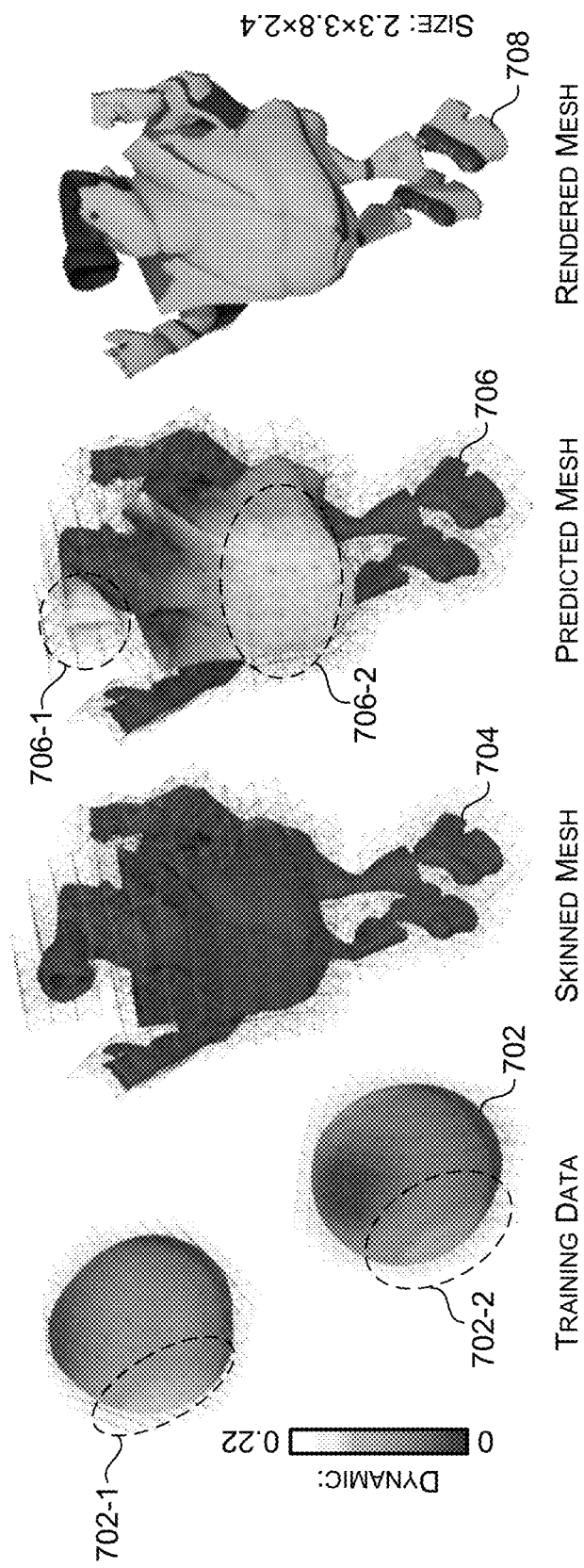
FIG. 7 is a schematic diagram illustrating how training meshes are used to provide a predicted mesh and a rendered mesh, according to some embodiments.

FIG. 7 is a schematic diagram illustrating how training meshes are used to provide a predicted mesh and a rendered mesh, according to some embodiments. FIG. 7 includes the training data 702, which represents a primitive sphere (e.g., sphere 604) dataset with deformation dynamics but generalizes across topology-varying 3D characters. The uniform volumetric mesh surrounding the surface mesh is used for prediction, where a set of vertices are set to be constraints (e.g., representing the head, arm, hand, leg, and feet regions). At inference or prediction time, the input may be an artist-specified skinned mesh 704 without dynamics or movement (e.g., representing the X values).

Various embodiments predict the dynamic mesh 706 with secondary motion. In response to the prediction, the rendered mesh 708 (which includes a surface mesh) is rendered with its textures (e.g., specific surface features, such as colors, facial features (e.g., eyes, nose, ears), articles of clothing, etc.). In some embodiments, such prediction of the mesh 706 occurs at a patch level (patch-by-patch), as described, for example, with respect to FIG. 1 through FIG. 6. As illustrated in FIG. 7, the predicted mesh 706 can be made based on the training data set 702. For example, during training, the spherical dataset 702 may exhibit patterns of specific motion parameters of vertexes, such as displacement values in the regions 702-1 and 702-2. Using these patterns, various embodiments can predict that the center vertices of the region 706-2 (i.e., a belly portion of the mesh 706) will exhibit similar movement parameter values to the center vertex patterns of the regions 702-1 and 702-2 depending on the specific primary motion data, material properties, and constraint data of the vertices.

Figure 8:
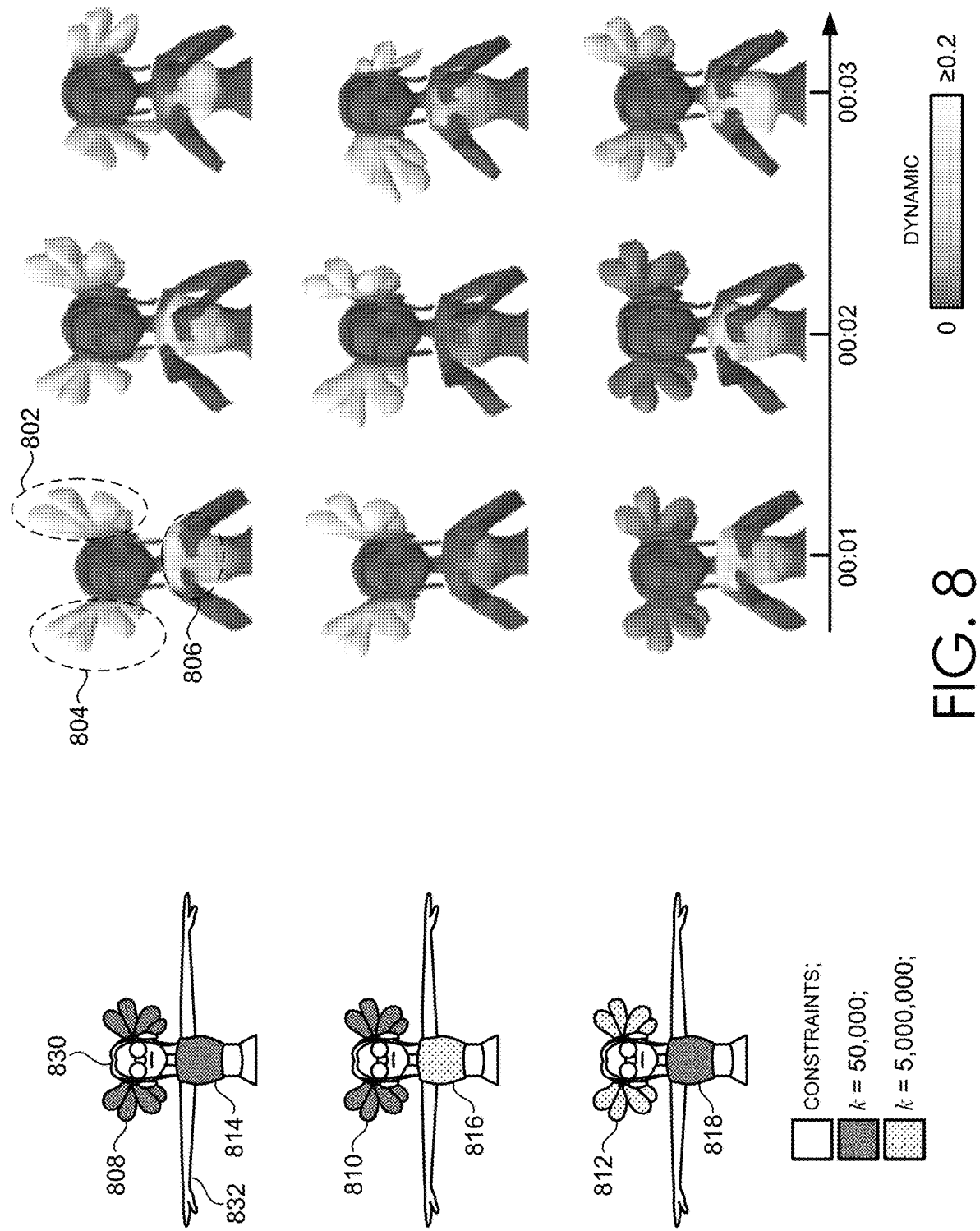
FIG. 8 is a schematic diagram illustrating how a user can control the material properties and/or constraint data of a mesh, according to some embodiments.

FIG. 8 is a schematic diagram illustrating how a user can control the material properties and/or constraint data of a mesh, according to some embodiments. Specifically, FIG. 8 illustrates how to control the dynamics by painting non-homogeneous material properties over the mesh. Varying stiffness values are painted on the hair region (e.g., 802 and 804)) and the chest region (e.g., 806) on the volumetric mesh. As illustrated in 808, 810, and 812, the user can set different k values for the hair of the same mesh. Likewise, the user can set different k values for the chest regions of the same mesh, as illustrated by 814, 816, and 818. The user can also set the constraints, such as the head region 830 and the arm region 832.

For better visualization, particular embodiments indicate the material settings across the surface mesh. For example, some embodiments indicate low stiffness values across a mesh with yellow colors, while high stiffness values are indicated with purple colors and constraint features, such as the head 830 and arms 832 are indicated in gray. Particular embodiments display three different material settings, by assigning different stiffness k values. Larger k means stiffer material, hence the corresponding region exhibits less dynamics or secondary motion. In contrast, the regions with smaller k shows significant dynamic effects or more secondary motion. This result demonstrates that particular embodiments correctly model the effect of material properties, while providing a user interface for the artist to efficiently adjust the desired dynamic effects, unlike existing technologies.

As described herein, various embodiments are directed to a deep learning approach to predict secondary motion (i.e., the deformable dynamics) of given skinned animations of 3D characters. Various embodiments address the shortcomings of learning-based approaches by designing a network architecture that can reflect the actual underlying physical process. Specifically, the various embodiments model the simulation using a volumetric mesh that includes a uniform tetrahedra surrounding the character mesh, where the mesh edges (that are connected to one or more vertices) encode the internal forces that depend on the current state (e.g., displacements/positions, velocities, accelerations), material properties (e.g., stiffness), and constraints on the vertices. Mesh vertices encode the inertia in some embodiments. Motivated by the observation that within a short time instance the secondary dynamics or secondary motion of a vertex is mostly affected by its current state, as well as the internal forces due to its neighbor vertices, various embodiments operate on local patches of the volumetric mesh. In addition to avoiding the computational complexity of encoding high resolution character meshes as large graphs, this also enables particular embodiments to be applied to any character mesh, independent of its topology. Finally, various embodiments encode per-vertex material properties and constraints, giving the user the ability to easily prescribe varying properties to different parts of the mesh to control the dynamic behavior.

As a unique benefit of the generalization capability of embodiments, it is not necessary to construct a massive training dataset of complex meshes and motions. Instead, particular embodiments construct training data from primitive geometries, such as a volumetric mesh of a sphere. Various network embodiments trained on this dataset can generate detailed and visually plausible secondary motions on much more complex 3D characters during testing. By assigning randomized motions to the primitives during training, the local patches cover a broad motion space, which improves the network's online predictions in unseen scenarios.

Experimental Results

As described herein, various embodiments improve existing technologies in terms of accuracy, among other things. The inventors have conducted experiments with regard to accuracy relative to existing technologies, as described in more detail below. In this section, we show qualitative and quantitative results of various embodiments, as well as comparisons to other technologies. An ablation study is also conducted to verify why explicitly providing the position information on the reference mesh as input is important in some instances.

Various character meshes and complex motion sequences were evaluated. These results demonstrate visually plausible and stable secondary motion while being over 30 times faster than the implicit Euler method commonly used in physically-based simulation, among others. Comparisons to faster methods were compared such as the explicit central differences method and other learning-based approaches that utilize graph convolutional networks. Various embodiments outperform those approaches both in terms of accuracy and robustness.

The dataset and evaluation metrics are described below. For training, a uniform tetrahedral mesh of a sphere was used. Eighty random motion sequences at 24 fps were generated, using a Vega FEM simulator. For each motion sequence, seven different material settings were used. Each motion sequence contains 456 frames, resulting in a total of 255k frames in the training set.

These embodiments were evaluated on 3D character animations obtained from Adobe's Mixamo dataset. Neither the character meshes nor the primary motion sequences are seen in the training data. Test cases were created for five different character meshes as listed in Table 1 (below) and 15 motions in total. The volumetric meshes for the test characters use the same uniform tetrahedron size as the training data. For all the experiments, we report three types of metrics, but exclude other components such as initialization, rendering and mesh interpolation.

TABLE 1

The running time of a single step (1/24 second) for the ground truth, the baseline, and our method.

| character | # vertices (tet mesh) | $t_{GT}$ s/frame | $t_{BL}$ s/frame | $t_{ours}$ s/frame |
|---|---|---|---|---|
| Big vegas | 1468 | 0.58 | 0.056 | 0.017 |
| Kaya | 1417 | 0.52 | 0.052 | 0.015 |
| Michelle | 1105 | 0.33 | 0.032 | 0.013 |
| Mousey | 2303 | 0.83 | 0.084 | 0.018 |
| Ortiz | 1258 | 0.51 | 0.049 | 0.015 |

Single-frame RMSE: The average root-mean-square error (RMSE) was measured between the prediction and the ground truth over all time frames, while providing the ground truth positions of the previous time frames as input.

Rollout RMSE: The previous predictions of the network were provided as input to the current frame in a recurrent manner and measure the average RMSE between the prediction and the ground truth over all frames.

E_elastic [min,stdev,max]: The concept of elastic energy is used in physically-based simulation to detect abnormalities in the deformation sequence, or any possible mesh explosions. For each frame, the elastic energy was calculated based on the current mesh displacements with respect to its reference state. The min,max was listed as well as the standard deviation (stdev) to show the energy distribution across the animation.

Analysis performance is described in more detail below. In Table 1, the speed t_ours is shown of our method, as well as that of the ground truth method t_GT and a baseline method t_BL. The implicit backward Euler approach (Equation 3) was adapted as ground truth and the faster explicit central differences integration (Equation 2) as the baseline. For each method, the time is recorded to calculate the dynamic mesh but exclude other components such as initialization, rendering and mesh interpolation.

Results indicate that these embodiments are around 30 times faster than the implicit integrator and 3 times faster than the explicit integrator, per frame. Although the explicit method has comparable speed to these embodiments, the simulation explodes after a few frames. In practice, explicit methods require much smaller time steps, which required additional 100 sub-steps in our experiments, to achieve stable quality.

Figure 9:
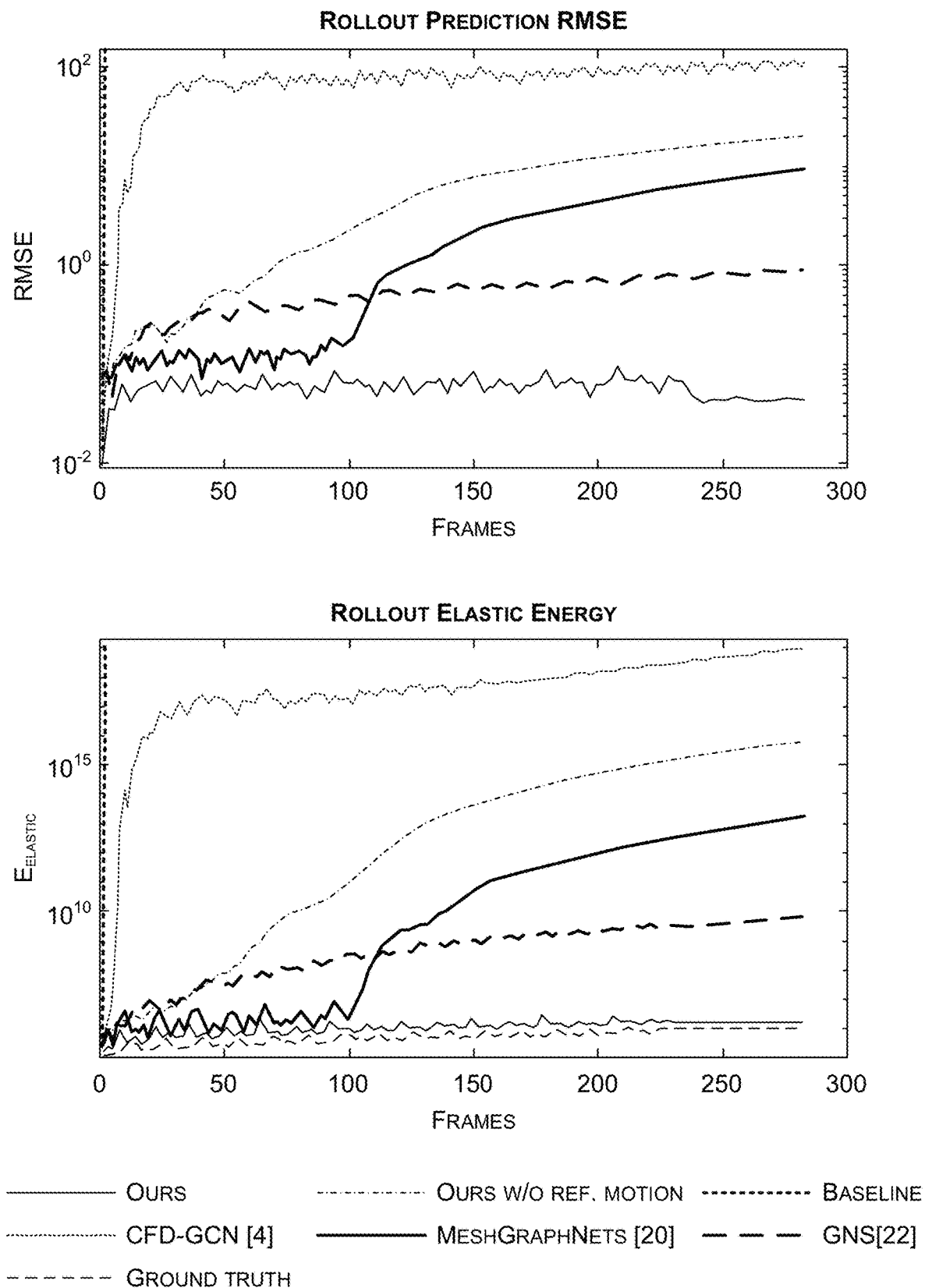
FIG. 9 is an example graph that illustrates the rollout prediction results of particular embodiments relative to existing technologies, according to some embodiments.

Generalization is described in more detail below. The network was trained on the sphere dataset and achieves a single frame RMSE of 0.0026 on the testing split of this dataset (the sphere has a radius of 2). As listed in Table 2 (below), when tested on characters, these embodiments achieve a single frame RMSE of 0.0067, showing remarkable generalization capability (we note that the shortest edge length on the volumetric character meshes is 0.2). The mean rollout error increases to 0.064 after running the whole sequences due to error accumulation, but elastic energy statistics are still close to the ground truth. From the visualization of the ground truth and the results, we can see that although the predicted secondary dynamics have slight deviation from the ground truth, they are still visually plausible. The rollout prediction RMSE and elastic energy of an example character are further plotted in FIG. 9. It can be seen that the prediction error remains under 0.07, and the mean elastic energy of "our" method (i.e., one of the embodiments of the present disclosure) is always close to the ground truth for the whole sequence, whereas the baseline method explodes quickly. These embodiments (i.e., "our method") can be over 30 times more efficient than ground-truth physically based simulation, and outperforms alternative solutions that provide fast approximations.

TABLE 2

The single-frame RMSE, rollout-24, rollout-48 and rollout-all of our method and others tested on all five characters with 15 different motions. The shortest edge length in the test meshes is 0.02.

| Methods | single frame | rollout-24 | rollout-48 | rollout-all | $E_{elastic}$ [min, stdev,, max] |
|---|---|---|---|---|---|
| Ground truth | \ | \ | \ | \ | [3.81E3, 4.06E5, 2.60E6] |
| Our method | 0.0067 | 0.059 | 0.062 | 0.064 | [4.84E3, 6.51E5, 6.32E6] |

TABLE 2-continued

The single-frame RMSE, rollout-24, rollout-48 and rollout-all of our method and others tested on all five characters with 15 different motions. The shortest edge length in the test meshes is 0.02.

| Methods | single frame | rollout-24 | rollout-48 | rollout-all | $E_{elastic}$ [min, stdev,, max] |
|---|---|---|---|---|---|
| Ours w/o ref. motion | 0.050 | 0.20 | 0.38 | 10.09 | [1.62E4, 6.7E16, 4.7E17] |
| Baseline | \ | 7.26E120 | 9.63E120 | 17.5E120 | [9.26E0, Nan, 7.22E165] |
| CFD-GCN | 0.040 | 41.17 | 70.55 | 110.07 | [3.96E4, 1.1E22, 1.6E23] |
| GNS | 0.049 | 0.22 | 0.34 | 0.54 | [1.09E4, 2.0E11, 2.3E10] |
| MeshGraphNets | 0.050 | 0.11 | 0.43 | 4.46 | [1.69E4, 1.1E15, 1.1E14] |

The ablation study is described in more detail below. To demonstrate that it is necessary to incorporate the reference mesh motion into the input features of particular embodiments, an ablation study is performed. To ensure that the constrained vertices are still driving the dynamic mesh in the absence of the reference information, the positions of the constrained vertices were updated based on the reference motion, at the beginning of each iteration. As input to the network architecture, the same set of features were used except the positions on the reference mesh. The results of "Ours w/o ref. motion" in Table 2 demonstrates that this version is inferior relative to other embodiments, especially when running the network over a long time sequence. This establishes that the reference mesh is indispensable to the quality of the network's approximation.

Figure 10:
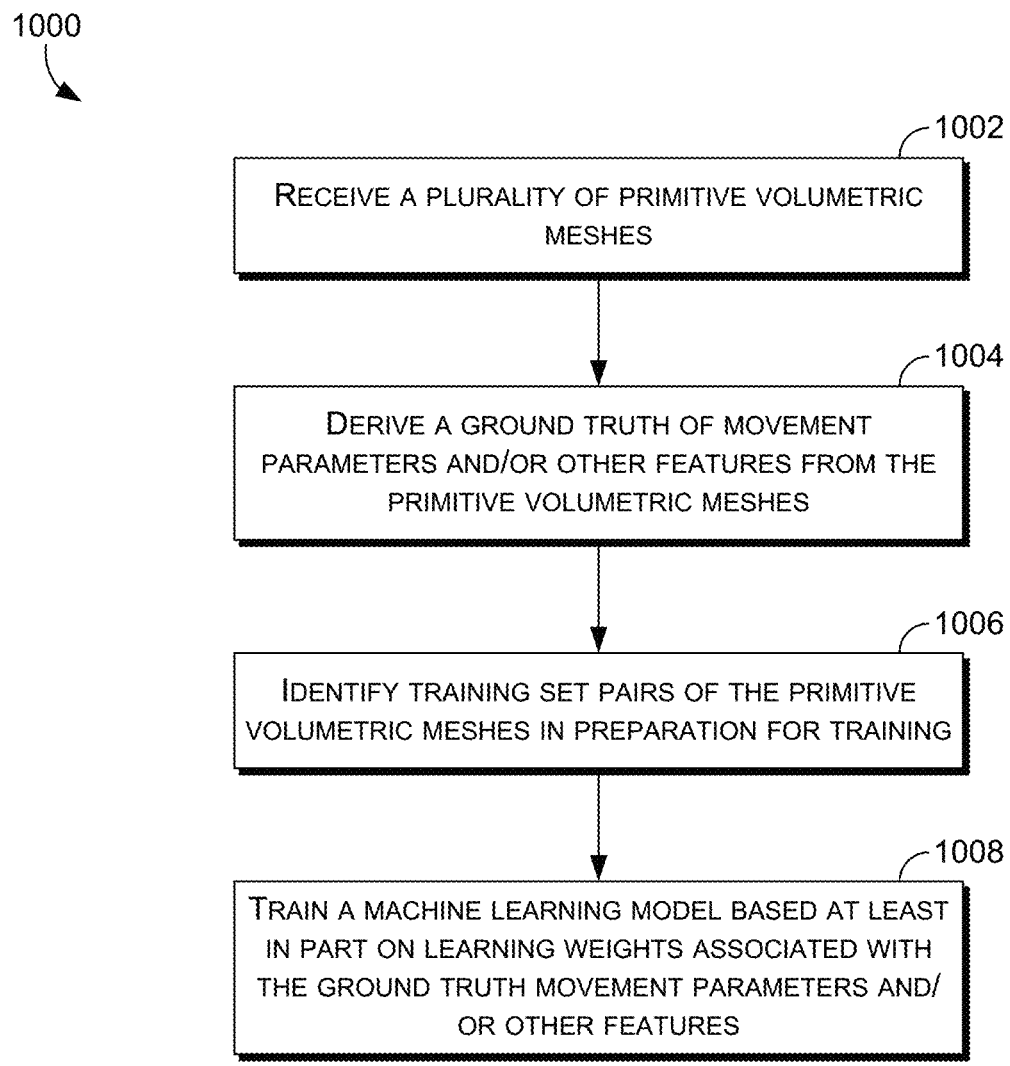
FIG. 10 is a flow diagram of an example process for training a machine learning model, according to some embodiments.

Various embodiments described herein improve existing technologies by using a Deep Emulator for enhancing skinning-based animations of 3D characters with vivid secondary motion. Particular embodiments are inspired by the underlying physical simulation. Specifically, some embodiments train a neural network that operates on a local patch of a volumetric simulation mesh of the character, and predicts the updated vertex positions from the current acceleration, velocity, and positions. Being a local method, various embodiments generalize across 3D character meshes of arbitrary topology Exemplary Flow Diagrams FIG. 10 is a flow diagram of an example process 1000 for training a machine learning model, according to some embodiments. The process 1000 (and/or any of the functionality described herein (e.g., process 1100)) may be performed by processing logic that comprises hardware (e.g., circuitry, dedicated logic, programmable logic, microcode, and the like), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer storage media as described herein may perform or be caused to perform the processes 1000, 1100, and/or any other functionality described herein.

Per block 1002, a plurality of primitive volumetric meshes are received. For example, referring back to FIG. 6, the sphere 604, the cube 602, and/or any other volumetric meshes are received (e.g., a cylinder, a three-dimensional triangle, etc.). Per block 1004, a ground truth of one or more movement parameters and/or other features (e.g., material properties) are derived from the primitive volumetric meshes. For example, ground truth position data of each center vertex of each patch in the volumetric meshes are received. Other examples of movement parameters are alternatively or additionally, acceleration data, velocity data, and/or the like of one or more vertices.

Per block 1006, training set pairs of the primitive volumetric meshes are identified in preparation for training. For instance, two training set pairs of the same type can be paired, such as two spherical volumetric meshes. In another example, two training set pairs of different types can be paired, such as a spherical volumetric mesh and a cube volumetric mesh.

Per block 1008, a machine learning model is trained based at least in part on learning weights associated with the ground truth movement parameters and/or other features. For example, various embodiments learn an embedding of patches of spherical volumetric meshes based on particular features (e.g., material properties) and other movement parameters in light of the ground truth. For instance, some embodiments can determine a distance between a ground truth position of a central vertex and another central vertex (for which a prediction will be made). Based on the loss (e.g., the difference in distance between the ground truth and another vertex) determined by a loss function (e.g., Mean Squared Error Loss (MSEL), cross-entropy loss), the loss function learns to reduce the error in prediction over multiple epochs or training session. For example, as described above, some embodiments train the final network with the mean square error loss:

$$l = \frac{1}{n}\sum_{i}^{n}\left\|\dot{u}'_i(t+1) - \dot{u}''_i(t+1)\right\|_2^2,$$

where ú'ᵢ(t+1) is the ground truth. Some embodiments adopt the Adam optimizer for training, with a learning rate starting from 0.0001 along with a decay factor of 0.96 at each epoch.

In some embodiments, pairs of similar volumetric meshes and/or dissimilar volumetric meshes are processed or run through a deep learning model by mapping vectors representing the features in feature space and computing a distance (e.g., Euclidian or Cosine) between the vectors. And based at least in part on the distance, weights associated with the deep learning model can be adjusted to indicate the importance of certain features of the set of visual renderings for prediction or classification. In some embodiments, the adjusting includes changing an embedding of the visual renderings in feature space. For example, after a first round or set of rounds of training, it may be unknown what features of the features of visual renderings are important for taking on a certain classification or prediction. Accordingly, each feature may take on equal weight (or close to equal weight within a threshold, such as a 2% changed weight) such that all indications of the vectors are substantially close or within a distance threshold in feature space. However, after several rounds of training or any threshold quantity of training, the indications may adjust or change distances from each other based on the feature similarity. The more features of two patches that match or are within a threshold value, the closer the patches are to each other, whereas when features do not match or are not within a threshold value, the further away the two patches are from each other.

In various embodiments, the training includes adjusting weights associated with the deep learning model to indicate the importance of certain features of the visual renderings for prediction or classification. In some embodiments, the training includes learning an embedding of patches or volumetric meshes in feature space. Learning an embedding may include learning the distance between two or more feature vectors representing patches based on feature similarity of values and adjusting weights of the deep learning model. For example, as described above, the more that features (e.g., material properties and movement parameters) of patches are matching or are within a threshold feature vector value, the closer the two patches are to each other in feature space, whereas when features do not match or are not within a feature vector value threshold, the further away the two patches are from each other in feature space.

Accordingly, in response to various training stages, the strength of connection between nodes or neurons of different layers can be weighted higher or strengthened based on the corresponding learned feature values that are most prominent or important. A "weight" in various instances represents the importance or significant of a feature or feature value for prediction. For example, each feature may be associated with an integer or other real number where the higher the real number, the more significant the feature is for its prediction. In some embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights proportionately reduce the value of the output. For instance, the more the value of the input increases, the more the value of the output decreases. Negative weights may contribute to negative scores, which are described in more detail below.

In this way, for example, an entire feature space may include an embedding of vectors or other indications that are all learned or embedded in feature spaced based on learning weights corresponding to different features such that feature vectors of patches or volumetric meshes with important features found in similar patches or volumetric meshes are within a threshold distance of each other in feature space, whereas feature vectors corresponding to dissimilar patches or volumetric meshes with features that are not important are not within a threshold distance of each other in the same feature space.

Figure 11:
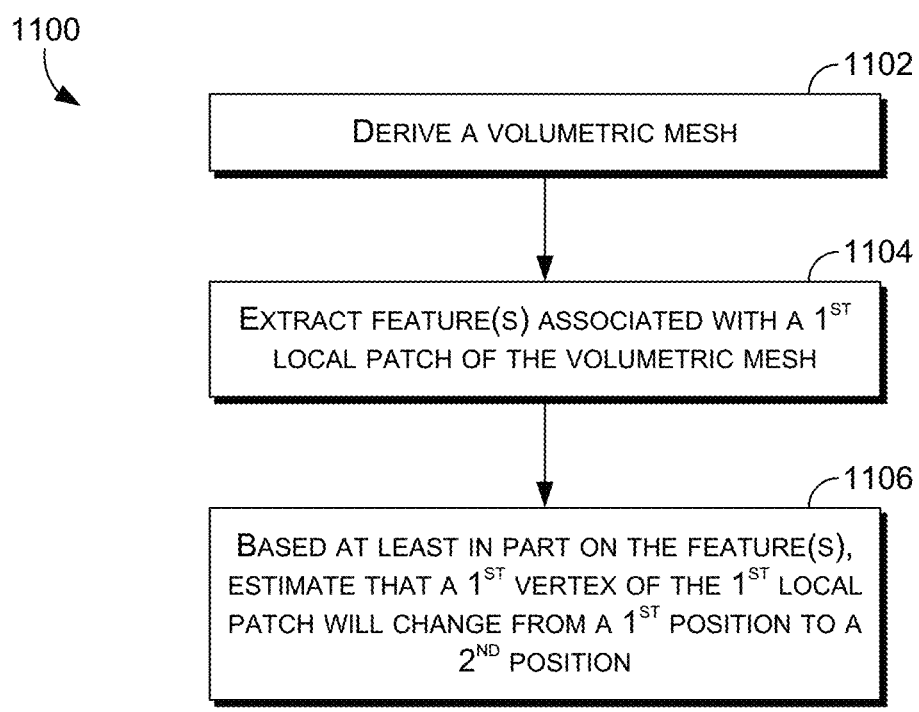
FIG. 11 is a flow diagram of an example process for estimating a change in a vertex position of a local patch, according to some embodiments.

FIG. 11 is a flow diagram of an example process 1100 for estimating a change in a vertex position of a local patch, according to some embodiments. Per block 1102 volumetric mesh is derived (e.g., received or generated). In some embodiments, such volumetric mesh indicates or represents an interior volume of a multi-dimensional (e.g., 3-dimensional) object at a first time frame (e.g., the time frame 110 of FIG. 1), where each volumetric mesh includes a plurality of local patches. For example, as described herein, particular embodiments construct a volumetric mesh using standard linear blend skinning techniques given the multi-dimensional object and its primary motion sequence obtained. Linear blend skinning is the concept of transforming vertices inside a single mesh by a (blend) of multiple transforms. Each transform is the concatenation of a "bind matrix" that takes the vertex into the local space of a given "bone" and a transformation matrix that moves from that bone's local space to a new position. Skinning is the process of controlling deformations of a given object using a set of deformation primitives. A typical example of an object often subjected to skinning is the body of a virtual character. In this case, the deformation primitives are rigid transformations associated with bones of an animation skeleton.

In some embodiments, the volumetric mesh derived at block 1102 is a tetrahedral mesh. An individual tetrahedral cell is made up of a tetrahedron that has 4 vertices, 6 edges, and is bounded by 4 triangular faces. A "mesh" is a representation of a larger geometric domain by smaller discrete cells (e.g., a patch). Meshes are commonly used to compute solutions of partial differential equations and render computer graphics, and to analyze geographical and cartographic data. A mesh partitions space into elements (or cells or zones) over which the equations can be solved, which then approximates the solution over the larger domain. Alternatively or additionally, in some embodiments other meshes are derived at block 1102. For example, such meshes can be made up of various cells or patches-3-dimensional-based cells, a hexahedron cell (8 vertices, 12 edges, 6 quadrilateral faces), a triangular prism cell (6 vertices, 9 edges, 2 triangular and 3 quadrilateral faces), a pyramid cell (5 vertices, 8 edges, 4 triangular and 1 quadrilateral faces), two-dimensional quadrilateral-based meshes (e.g., triangle-shaped (3 sides)), quadrilateral-shaped (4-sided)), or even a surface mesh.

Per block 1104, particular embodiments extract one or more features associated with a first local patch of the volumetric mesh (e.g., in response to the deriving of the volumetric mesh at block 1102). Examples of block 1104 are described with respect to the neighbor vertex processing module 304 of FIG. 3, the central vertex processing module 306 of FIG. 3, the MLP 404 of FIG. 4, and the MLP 406 of FIG. 4. In some embodiments, the one or more features are extracted from data structures representing the edges and/or vertices of the first patch. In some embodiments edge encode the one or more features. Alternatively or additionally, vertices encode the one or more features.

In some embodiments, the first local patch includes a plurality of vertices, where each vertex of the plurality of vertices is connected to at least one edge that at least partially forms the first local patch. In some embodiments, the plurality of vertices include a first vertex at a first position. A "patch" or "local patch" described herein can be any cell or mesh unit described herein, such as a tetrahedral cell, a hexahedron cell, a triangular prism cell, a pyramid cell, and/or the like. Examples of a "patch" or "local" patch described herein are illustrated in FIG. 1 (e.g., the patch 102). In some embodiments, the plurality of vertices include a center (or central) vertex and a set of neighbor vertices that surround the center vertex. For example, referring back to FIG. 3, the center vertex may be vertex 500-2 and the neighboring vertices may include 500-6, 500-5, 500-4, 500-3, and 500-1.

In some embodiments, the one or more features that are extracted per block 1104 include at least one of: primary motion data, one or more material properties, and constraint data. In some embodiments "primary motion data" indicates at least one of acceleration data associated with the first local patch, displacement data associated with the first local patch, and velocity data associated with the first local patch. For example, one or more edges and/or vertices of the first local patch may encode a current acceleration, displacement, and/or velocity of one or more vertices of the first local patch. In some embodiments, "acceleration data" includes the rate of change in velocity for a particular vertex of the first patch at a current given time frame (e.g., the time frame 110 of FIG. 1). In some embodiments, "displacement data" refers to the directional and magnitude of displacement of a vertex from a current position at a current time frame relative to the displacement or position of the vertex at a prior position or prior time frame. For example, displacement data can indicate that a particular vertex is at a particular X, Y coordinate relative to its last X, Y coordinates. In some embodiments, the "velocity data" refers to a rate of change of a vertex's position with respect to a frame of reference and is a function of time. Put simply, a velocity may include the speed at which a vertex moves in one direction.

In some embodiments, the one or more material properties include at least one of a stiffness value and a mass value associated with the first local patch. In some embodiments, a "stiffness value" refers to Young's Modulus. The Young's Modulus (or Elastic Modulus) indicates the stiffness of a material. In other words, it is how easily it is bended or stretched. To be more exact, the physics and numerical values are indicated as Stress/Strain. In some embodiments, stiffness, k, is defined as the magnitude of a force, F, acting on an object, divided by a deformation, δ, of the object (k=F/δ). In the context of meshes, and in some embodiments, stiffness is an indicator of the degrees of freedom for which any particular vertex and/or edge is able to freely move. In some embodiments, a "mass value" refers to the amount of matter associated with a patch and/or mesh. In physics, mass is a quantitative measure of inertia, a fundamental property of all matter. It is, in effect, the resistance that a body of matter offers to a change in its speed or position (or acceleration) upon the application of a force. The greater the mass of a body, the smaller the change produced by an applied force. In the context of the present disclosure, mass can be measured in terms of the quantity of inertia or resistance that any vertex with experience upon a force, the quantity of edges and/or vertices of a single patch, and/or the quantity of patches in a single mesh.

In some embodiments, the constraint data indicates whether the first patch is subject to secondary (or primary) motion. In some embodiments, constraint data is defined at the vertex level such that embodiments (e.g., edges) encode whether each vertex is subject to being constrained (e.g., kept from being moved). In some embodiments, the constraint data indicates whether one or more vertices are subject to any movement or displacement at all. In some embodiments, the one or more material properties and/or constraint data is user-defined. Examples of this are described with respect to FIG. 8 where users can paint different stiffness and constraint values over various body parts that include various patches.

Per block 1106, based at least in part on the one or more features at block 1104, particular embodiments estimate that a first vertex of the first local patch will change from a first position to a second position. In some embodiments, the second position is at least partially indicative of secondary motion associated with the first local patch. Examples of block 1106 are described with respect to the patch concatenation module 308 of FIG. 3 and the MLP 408 of FIG. 4. In some embodiments, the estimating is further based on using a deep neural network machine learning model. A "deep neural network machine learning model" as described herein refers to a neural network (e.g., Convolutional Neural Networks, Recurrent Neural Networks, Boltzmann machines, AutoEncoders, etc.) that has an input layer, an output layer and at least one hidden layer in between the input layer and output layer. Each layer performs specific types of sorting and ordering in a process referred to as "feature hierarchy."

In some embodiments, the deep neural network machine learning model is trained using objects representing three-dimensional shapes that include at least one of: a sphere and a cube. Examples of this are described with respect to FIG. 6 and the process 1000 of FIG. 10 Accordingly, in some embodiments, the estimation at block 1106 is based at least in part on training. For instance, given the primary motion data, the material properties data, and the constraint data of each vertex of the first local patch, the first vertex can be determined to be in the second position, where the second position generally reflects the ground truth based on similar features (e.g., primary motion data, material properties) to the first patch that were extracted at training time.

In some embodiments, a surface mesh is generated in response to the estimating at block 1106. The surface mesh may indicate a surface of the multidimensional object. Examples of this surface mesh functionality are described with respect to FIG. 7, where the rendered mesh 708 is generated. In this way, based at least in part on the estimating, a visual rendering that represents the multi-dimensional object at a second time frame (e.g., time frame 112 of FIG. 1) subsequent to the first time frame (e.g., time frame 110 of FIG. 1). In some embodiments, a "visual rendering" can represent a predicted mesh, such as the predicted mesh 706, alternative to the rendered mesh 708 of FIG. 7. In some embodiments, the first vertex is a central vertex, such that the movement of the central vertex is predicted, as illustrated, for example, with regard to FIG. 1.

In some embodiments, such patch-level predictions can be made for some or each patch of non-constrained meshes in order to provide a mesh-level prediction of secondary movement. In this way, each patch prediction can be summed, concatenated, or otherwise aggregated in order to derive a predicted mesh (e.g., the predicted mesh 706 of FIG. 7). In operation, for example, various embodiments extract a second set of features associated with a second local patch of the plurality of local patches, where the second local patch includes a second vertex at a third position. And based at least in part on the second set of features, particular embodiments estimate that the second vertex will change from the third position to a fourth position. The fourth position may be at least partially indicative of more secondary motion associated with the second local patch. Accordingly, the generating of the visual rendering (or surface mesh) is further based on the estimating that the second vertex will change from the third position to the fourth position. The term "position" as described herein can also include "displacement" data or other indicators of location (e.g., in an X, Y, Z plane).

Alternative or in addition to estimating the "position" or displacement of a vertex as described at block 1106, some embodiments estimate other movement parameters at block 1106. A "movement parameter" as described herein refer to any suitable movement characteristic of a vertex, such as estimating the vertex's acceleration, estimating the vertex's velocity, and/or any other kinematic information.

Exemplary Operating Environments

Figure 12:
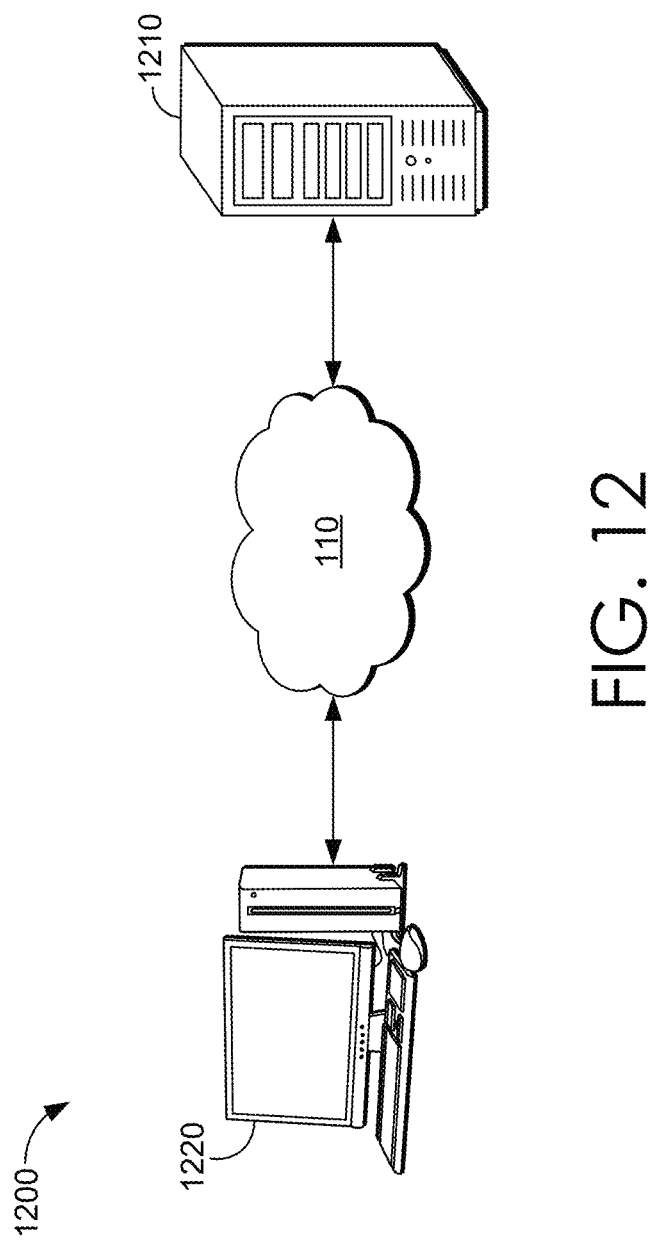
FIG. 12 is an example computer environment in which aspects of the present disclosure are employed, according to some embodiments.

Turning now to FIG. 12, a schematic depiction is provided illustrating an example computing environment 1200 for predicting secondary motions or estimation a movement parameter, in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. For example, there may be multiple servers 1210 that represent nodes in a cloud computing network. Various functions described herein as being performed by one or more entities may be carried out by hardware, firmware, and/or software. For instance, various functions may be carried out by a processor executing instructions stored in memory.

The environment 1200 depicted in FIG. 12 includes a prediction server ("server") 1210 that is in communication with a network(s) 110. The environment 1200 further includes a client device ("client") 1220 that is also in communication with the network(s) 110. Among other things, the client 1220 can communicate with the server 1210 via the network(s) 110, and generate for communication, to the server 1210, a request to generate a visual rendering or predicted mesh (e.g., mesh 706 of FIG. 7), as described herein. In various embodiments, the client 1220 is embodied in a computing device, which may be referred to herein as a client device or user device, such as described with respect to the computing device 1300 of FIG. 13.

In some embodiments, each component in FIG. 12 is included in the server 1210 and/or the client device 1220. Alternatively, in some embodiments, the components of FIG. 12 are distributed between the server 1210 and client device 1220.

The server 1210 can receive the request communicated from the client 1220, and can search for relevant data via any number of data repositories to which the server 1210 can access, whether remotely or locally. A data repository can include one or more local computing devices or remote computing devices, each accessible to the server 1210 directly or indirectly via network(s) 110. In accordance with some embodiments described herein, a data repository can include any of one or more remote servers, any node (e.g., a computing device) in a distributed plurality of nodes, such as those typically maintaining a distributed ledger (e.g., block chain) network, or any remote server that is coupled to or in communication with any node in a distributed plurality of nodes. Any of the aforementioned data repositories can be associated with one of a plurality of data storage entities, which may or may not be associated with one another. As described herein, a data storage entity can include any entity (e.g., retailer, manufacturer, e-commerce platform, social media platform, web host) that stores data (e.g., names, demographic data, purchases, browsing history, location, addresses) associated with its customers, clients, sales, relationships, website visitors, or any other subject to which the entity is interested. It is contemplated that each data repository is generally associated with a different data storage entity, though some data storage entities may be associated with multiple data repositories and some data repositories may be associated with multiple data storage entities. In various embodiments, the server 1210 is embodied in a computing device, such as described with respect to the computing device 1300 of FIG. 13.

Figure 13:
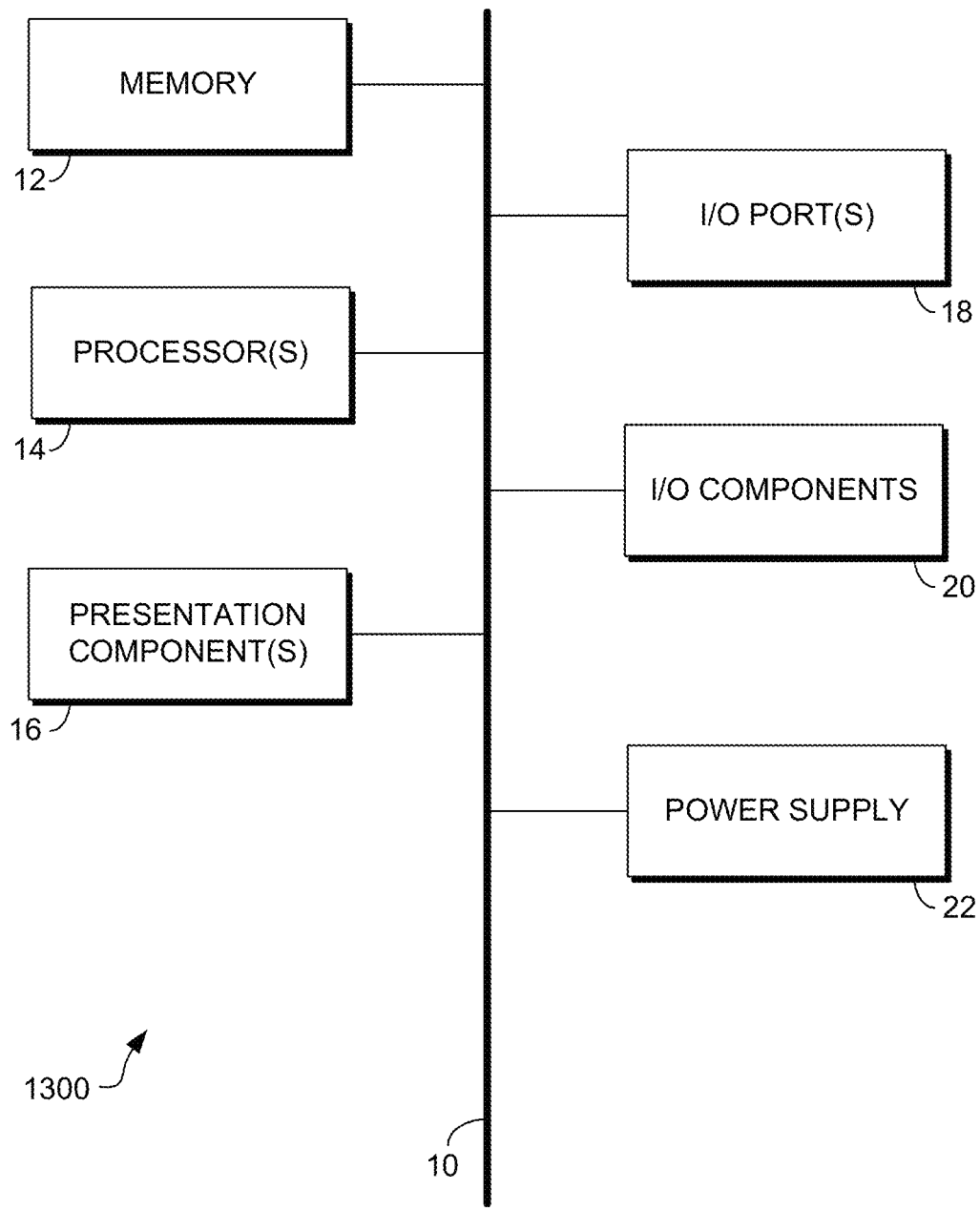
FIG. 13 is a block diagram of a computing device in which aspects of the present disclosure employ, according to some embodiments.

Having described embodiments of the present invention, an exemplary operating environment in which embodiments of the present invention may be implemented is described below in order to provide a general context for various aspects of the present invention. Referring initially to FIG. 13 in particular, an exemplary operating environment for implementing embodiments of the present invention is shown and designated generally as computing device 1300. Computing device 1300 is but one example of a suitable computing environment and is not intended to suggest any limitation as to the scope of use or functionality of the invention. Neither should the computing device 1300 be interpreted as having any dependency or requirement relating to any one or combination of components illustrated.

Looking now to FIG. 13, computing device 1300 includes a bus 10 that directly or indirectly couples the following devices: memory 12, one or more processors 14, one or more presentation components 16, input/output (I/O) ports 18, input/output components 20, and an illustrative power supply 22. Bus 10 represents what may be one or more busses (such as an address bus, data bus, or combination thereof). Although the various blocks of FIG. 13 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 13 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 13 and reference to "computing device."

Computing device 1300 typically includes a variety of computer-readable media. Computer-readable media can be any available media that can be accessed by computing device 1300 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1300. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. In various embodiments, the computing device 1300 represents the client device 1220 and/or the server 1210 of FIG. 12.

Memory 12 includes computer-storage media in the form of volatile and/or nonvolatile memory. The memory may be removable, non-removable, or a combination thereof. Exemplary hardware devices include solid-state memory, hard drives, optical-disc drives, etc. Computing device 1300 includes one or more processors that read data from various entities such as memory 12 or I/O components 20. Presentation component(s) 16 present data indications to a user or other device. Exemplary presentation components include a display device, speaker, printing component, vibrating component, etc. In some embodiments, the memory includes program instructions that, when executed by one or more processors, cause the one or more processors to perform any functionality described herein, such as the process 1000 of FIG. 10, the process 1100 of FIG. 11, and/or any functionality described with respect to FIGS. 1 through 12.

I/O ports 18 allow computing device 1300 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1300. The computing device 1300 may be equipped with depth cameras, such as stereoscopic camera systems, infrared camera systems, RGB camera systems, touchscreen technology, and combinations of these, for gesture detection and recognition. Additionally, the computing device 1300 may be equipped with accelerometers or gyroscopes that enable detection of motion. The output of the accelerometers or gyroscopes may be provided to the display of the computing device 1300 to render immersive augmented reality or virtual reality.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computerized system, the system comprising:
one or more processors; and
computer storage memory having computer-executable instructions stored thereon which, when executed by the one or more processors, implement a method comprising:
deriving a volumetric mesh, the volumetric mesh indicates an interior volume of a multi-dimensional object at a first time frame, the volumetric mesh including a plurality of local patches;
extracting one or more features of a first vertex that is included within a first local patch and not within any other local patch of the plurality of local patches, the first local patch includes a plurality of vertices, each vertex of the plurality of vertices connected to at least one edge that at least partially forms the first local patch, the first vertex being at a first position, the one or more features include at least one of: primary motion data of the first vertex, a material property of the first vertex, and constraint data of the first vertex;
based on the one or more features of the first vertex, estimating that the first vertex will change from the first position to a second position within the first local patch, the second position being at least partially indicative of secondary motion associated with the first local patch; and
generating a visual rendering that represents the multi-dimensional object at a second time frame subsequent to the first time frame.

2. The system of claim 1, wherein the plurality of vertices includes a center vertex and a set of neighbor vertices that surround the center vertex, and wherein the first vertex is the center vertex.

3. The system of claim 1, wherein the primary motion data indicates at least one of: acceleration data associated with the first local patch, displacement data associated with the first local patch, and velocity data associated with the first local patch.

4. The system of claim 1, wherein the material property includes at least one of: stiffness values and mass values associated with the first local patch.

5. The system of claim 1, wherein the constraint data indicates whether the first patch is subject to secondary motion or primary motion.

6. The system of claim 1, wherein the estimating is further based on using a deep neural network machine learning model that is trained using objects representing three-dimensional shapes, the three-dimensional shapes including at least one of: a sphere and a cube.

7. The system of claim 1, wherein at least one of the material property and the constraint data is user-defined.

8. The system of claim 1, the method further comprising generating, in response to the estimating, a surface mesh, the surface mesh indicating a surface of the multi-dimensional object.

9. The system of claim 1, the method further comprising:
extracting a second set of features associated with a second local patch of the plurality of local patches, the second local patch including a second vertex at a third position;
based at least in part on the second set of features, estimating that the second vertex will change from the third position to a fourth position, the fourth position being at least partially indicative of more secondary motion associated with the second local patch, and wherein the generating of the visual rendering is further based on the estimating that the second vertex will change from the third position to the fourth position.

10. The system of claim 1, wherein the volumetric mesh is a tetrahedral mesh.

11. A method comprising:
deriving a mesh, the mesh indicates an interior volume of an object at a first time frame, the mesh including a plurality of local patches;
in response to the deriving of mesh, extracting one or more features of a first vertex included in a first local patch of the plurality of local patches, the one or more features include at least one of: primary motion data of the first vertex, a material property of the first vertex, and constraint data of the first vertex, the first vertex partially defining the first local patch, the first vertex not being within any other local patches, of the plurality of local patches, the first vertex being in a first position; and
based at least in part on the one or more features of the first vertex, generating, via a deep neural network machine learning model, an estimate that the first vertex will change from the first position to a second position within the first local patch, the second position being indicative of secondary motion of the first vertex based on the one or more features.

12. The method of claim 11, wherein the estimate includes estimating a movement parameter of one or more vertices of the first local patch, and wherein the movement parameter includes at least one of: a position of the one or more vertices, an acceleration of the one or more vertices, and a velocity of the one or more vertices.

13. The method of claim 11, wherein the first local patch includes a plurality of vertices that include a center vertex and a set of neighbor vertices that surround the center vertex.

14. The method of claim 11, wherein the one or more features includes primary motion data that indicates at least one of: acceleration data associated with the first local patch, displacement data associated with the first local patch, and velocity data associated with the first local patch.

15. The method of claim 11, wherein the one or more features includes one or more material properties that include at least one of: stiffness values and mass values associated with the first local patch.

16. The method of claim 11, wherein the one or more features includes constraint data that indicates whether the first patch is subject to motion.

17. The method of claim 11, wherein the generating of the estimate is further based on using a deep neural network machine learning model that is trained using objects representing three-dimensional shapes.

18. The method of claim 11, the method further comprising generating, in response to the generating of an estimate, a surface mesh, the surface mesh indicates a surface of the multi-dimensional object.

19. A computerized system comprising:
a neighbor vertex processing means for extracting a first feature for each vertex of a first set of vertices, the first set of vertices defining a boundary of a first local patch, the first feature includes at least one of: primary motion data of each vertex of the first set of vertices, a material property of each vertex of the first set of vertices, and constraint data of each vertex of the first set of vertices;
a central vertex processing means for extracting a second feature of a second vertex, the second vertex being a central vertex of the first local patch, the second feature includes at least one of: primary motion data of the central vertex, a material property of the central vertex, and constraint data of the central vertex, the central vertex not being within any other local patch, the central vertex being situated between the first set of vertices; and
a patch concatenation means for estimating that the second vertex will change from a first position to a second position within the first local patch based on the first feature for the first set of vertices and the second feature for the central vertex, the second position being at least partially indicative of secondary motion associated with the first local patch.

20. The system of claim 19, wherein the first feature and the second feature include at least one of: primary motion data, material properties data, and constraint data for a respective vertex.

* * * * *